(12) United States Patent
Fan et al.

(10) Patent No.: US 9,609,649 B2
(45) Date of Patent: Mar. 28, 2017

(54) ADAPTIVELY USING SUBFRAMES FOR RADAR DETECTION IN UNLICENSED SPECTRUM

(71) Applicant: QUALCOMM Incorporated, San Diego, CA (US)

(72) Inventors: Mingxi Fan, San Diego, CA (US); Ahmed Kamel Sadek, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 14/457,830

(22) Filed: Aug. 12, 2014

(65) Prior Publication Data

US 2015/0296508 A1 Oct. 15, 2015

Related U.S. Application Data

(60) Provisional application No. 61/978,661, filed on Apr. 11, 2014.

(51) Int. Cl.
*H04W 72/04* (2009.01)
*H04W 16/14* (2009.01)
*H04W 4/06* (2009.01)

(52) U.S. Cl.
CPC .......... *H04W 72/0446* (2013.01); *H04W 4/06* (2013.01); *H04W 16/14* (2013.01); *H04W 72/0486* (2013.01)

(58) Field of Classification Search
CPC ... H04W 4/06; H04W 16/14; H04W 72/0446; H04W 72/0486
See application file for complete search history.

(56) References Cited

U.S. PATENT DOCUMENTS

| 8,675,605 | B2 | 3/2014 | Charbit et al. |
| 2009/0160696 | A1 | 6/2009 | Pare et al. |
| 2009/0247201 | A1* | 10/2009 | Ye ........................ H04W 16/14 455/509 |
| 2013/0315152 | A1 | 11/2013 | Ratasuk et al. |

(Continued)

OTHER PUBLICATIONS

International Search Report and Written Opinion—PCT/US2015/024570—ISA/EPO—Jul. 8, 2015. (12 total pages).

*Primary Examiner* — Noel Beharry
*Assistant Examiner* — Richard Schnell
(74) *Attorney, Agent, or Firm* — Arent Fox LLP

(57) ABSTRACT

Systems and methods for adaptively using subframes for radar detection in unlicensed spectrum are disclosed. The systems and methods include scheduling a first set of subframes in a frame duration for traffic based at least in part on a first configuration for communications in an unlicensed frequency band. Further, the systems and methods include scheduling, based at least in part on the first configuration, a second set of subframes in the frame duration for detection of a primary user of the unlicensed frequency band. Moreover, the systems and methods include adjusting a number of subframes in the first and second set of subframes based on a second configuration for communications, wherein the second configuration for communications is identified based on a type of primary user being detected.

22 Claims, 15 Drawing Sheets

(56) References Cited

U.S. PATENT DOCUMENTS

| | | | |
|---|---|---|---|
| 2013/0329711 A1* | 12/2013 | Seo | H04J 11/0069 370/336 |
| 2013/0343288 A1 | 12/2013 | Ratasuk et al. | |
| 2014/0031054 A1 | 1/2014 | Zou et al. | |
| 2014/0044105 A1* | 2/2014 | Bontu | H04L 5/001 370/336 |
| 2014/0050203 A1 | 2/2014 | Doppler et al. | |
| 2015/0163823 A1 | 6/2015 | Sadek et al. | |

* cited by examiner

ADAPTIVELY USING SUBFRAMES FOR RADAR DETECTION IN UNLICENSED SPECTRUM

CLAIM OF PRIORITY UNDER 35 U.S.C §119

The present Application for Patent claims priority to U.S. Provisional Application No. 61/978,661 entitled "METHODS AND APPARATUS FOR ADAPTIVELY USING SUBFRAMES FOR RADAR DETECTION" filed Apr. 11, 2014, assigned to the assignee hereof and hereby expressly incorporated by reference.

BACKGROUND

Aspects of this disclosure relate generally to telecommunications, and more particularly to interference mitigation and the like.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Communication between devices in a wireless communication network may be subject to interference. For a communication from a first network device to a second network device, emissions of radio frequency (RF) energy by a nearby device may interfere with reception of signals at the second network device. For example, a Long Term Evolution (LTE) device operating in an unlicensed RF band that is also being used by a Wi-Fi device may experience significant interference from the Wi-Fi device, and/or can cause significant interference to the Wi-Fi device.

Over-the-air interference detection is employed in some wireless communication networks in an attempt to mitigate such interference. For example, a device may periodically monitor (e.g., sniff) for energy in the RF band used by the device. Upon detection of any kind of energy, the device may back-off the RF band for a period of time.

In practice, however, there may be problems with such a back-off or "listen-before-talk" (LBT) approach, at least in its conventional implementation. For example, for an LTE system operating in an unlicensed band with a Wi-Fi co-channel scenario where it is desired to avoid interference from Wi-Fi, the detected energy in the band might not be from a Wi-Fi device, or might not be substantial. In addition, the detected energy in the band may simply be adjacent channel leakage. Consequently, an LTE device may back off transmissions in the band even when there is no Wi-Fi interference.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for adaptively using subframes for radar detection in unlicensed spectrum is disclosed. The method includes scheduling a first set of subframes in a frame duration for traffic based at least in part on a first configuration for communications in an unlicensed frequency band. Further, the method includes scheduling, based at least in part on the first configuration, a second set of subframes in the frame duration for detection of a primary user of the unlicensed frequency band. Moreover, method includes adjusting a number of subframes in the first and second set of subframes based on a second configuration for communications, wherein the second configuration for communications is identified based on a type of primary user being detected.

Further aspects provide a computer program product for adaptively using subframes for radar detection in unlicensed spectrum comprising at least one instruction executable to cause a computer to schedule a first set of subframes in a frame duration for traffic based at least in part on a first configuration for communications in an unlicensed frequency band Further, the computer program product includes at least one instruction executable to cause the computer to schedule, based at least in part on the first configuration, a second set of subframes in the frame duration for detection of a primary user of the unlicensed frequency band. Moreover, the computer program product includes at least one instruction executable to cause the computer to adjust a number of subframes in the first and second set of subframes based on a second configuration for communications, wherein the second configuration for communications is identified based on a type of primary user being detected.

Additional aspects provide an apparatus for adaptively using subframes for radar detection in unlicensed spectrum comprises means for scheduling a first set of subframes in a frame duration for traffic based at least in part on a first configuration for communications in an unlicensed frequency band. Further, the apparatus includes means for scheduling, based at least in part on the first configuration, a second set of subframes in the frame duration for detection of a primary user of the unlicensed frequency band Moreover, the apparatus includes means for adjusting a number of subframes in the first and second set of subframes based on a second configuration for communications, wherein the second configuration for communications is identified based on a type of primary user being detected.

In an additional aspect, an apparatus for adaptively using subframes for radar detection in unlicensed spectrum comprises a memory storing executable instructions and a processor in communication with the memory, wherein the processor is configured to execute the instructions to schedule a first set of subframes in a frame duration for traffic based at least in part on a first configuration for communications in an unlicensed frequency band. Further, the processor is further configured to execute the instructions to schedule, based at least in part on the first configuration, a second set of subframes in the frame duration detection of a primary user of the unlicensed frequency band. Moreover, the processor is further configured to execute the instructions to adjust a number of subframes in the first and second set of subframes based on a second configuration for communications, wherein the second configuration for communications is identified based on a type of primary user being detected.

Various aspects and features of the disclosure are described in further detail below with reference to various examples thereof as shown in the accompanying drawings.

While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
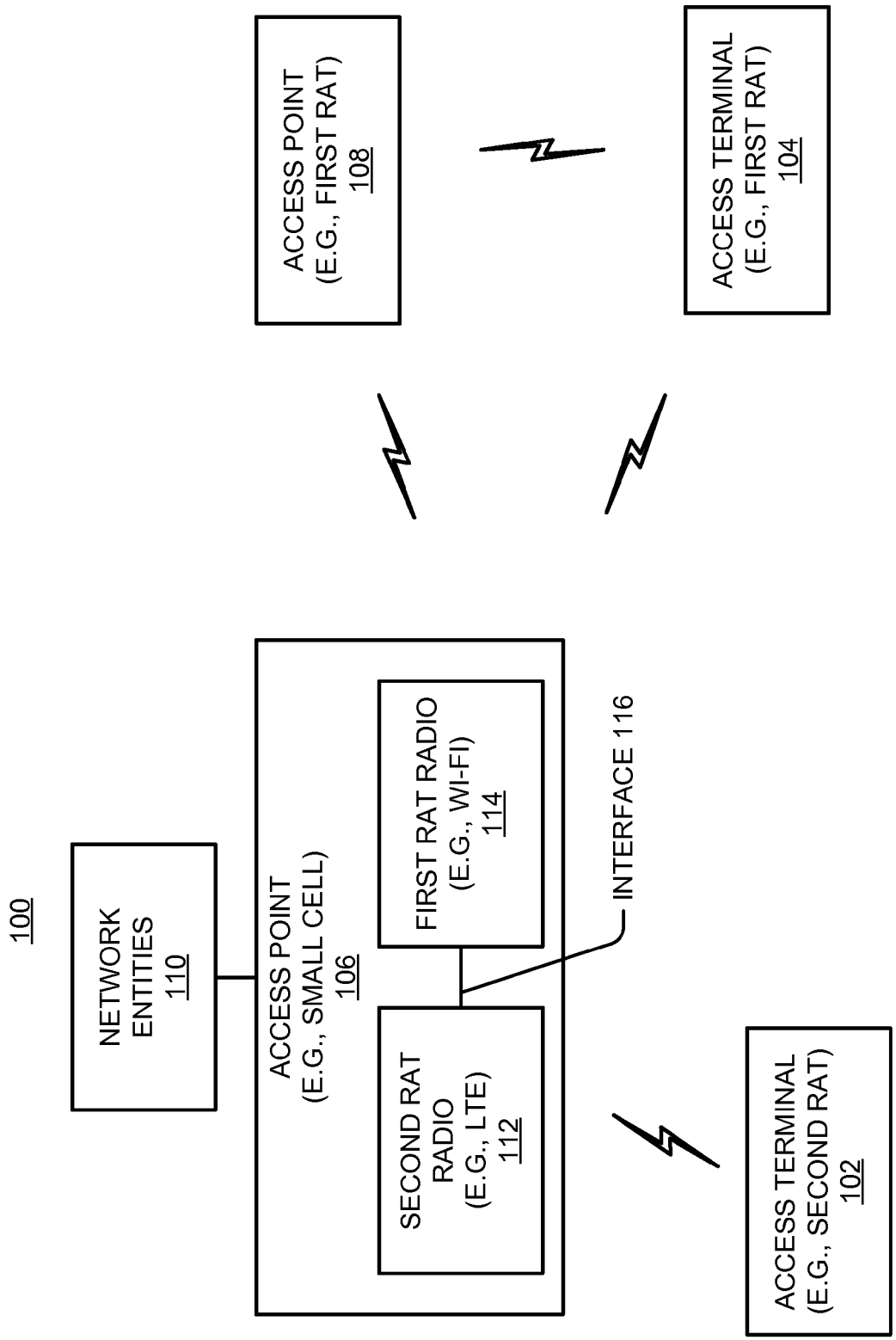
FIG. 1 is a block diagram illustrating an example of several aspects of a communication system employing co-located radios.

The present aspects generally relate to adaptively using multi-cast broadcast single-frequency network (MBSFN) subframes for radar detection. For example, a network entity may communicate on both a licensed frequency band and an unlicensed frequency band. Specifically, a network entity may detect a primary user of a shared channel on an unlicensed frequency band (e.g., 5 GHz frequency band). A primary user may refer to a user having some level of priority or preference over other users (e.g., secondary users) to operate on a shared channel. For example, radar operations may be a primary user of a shared channel in an unlicensed spectrum because, in some instances, radar detection is required on certain channels in 5 GHz. A network entity operating on a channel requiring radar detection may be required to continue monitoring the channel for radar signals, and cease transmission once radar signals are detected. However, radar detection may not be possible in frequency division duplex (FDD) mode of operation (along with supplemental downlink (SDL)) when the network entity is continuously in transmission mode.

FDD is a technique where separate frequency bands are used at the transmitter and receiver side. Because the FDD technique uses different frequency bands for send and receive operations, the sending and receiving data signals don't interfere with each other. For instance, in mobile wireless networks, one block of the electromagnetic spectrum is allocated for uplink, which carries data from mobile phones to a base station. A different block of the spectrum is allocated to downlink, carrying data from a base station to mobile phones. Furthermore, SDL is a technique that uses unpaired frequency bands to offer additional downlink capacity. As such, dynamic frequency selection (DFS) may be enabled with FDD/SDL operation in the unlicensed frequency band by, for example, configuring MBSFN subframes to create listening times (or gaps) for radar detection. DFS is the process of detecting radar signals that must be protected against interference from 5.0 GHz radios, and upon detection switching the operating frequency of the 5.0 GHz radio to one that is not interfering with the radar systems.

In some aspects, detecting radar on the unlicensed frequency band may require the network entity to schedule gaps for a period of time especially when the network entity is in transmission mode (e.g., SDL). The gaps for the period of time allow for the network entity to monitor for radar signals. Creating gaps for the period of time for radar detection may prevent interference on the channel with other radio access technologies (RATs) (e.g., WiFi).

Accordingly, in some aspects, the present methods and apparatuses may provide an efficient solution, as compared to current solutions, by adaptively using subframes, such as MBSFN subframes, for example, for radar detection in a wireless communication system.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points, which may correspond to network entity 404 including subframe component 420 (FIG. 5), in the system 100 provide access to one or more services (e.g., network connectivity) for one or more wireless terminals (e.g., the access terminal 102 or the access terminal 104) that may be installed within or that may roam throughout a coverage area of the system 100. For example, at various points in time the access terminal 102 may connect to the access point 106 or some other access point in the system 100 (not shown). Similarly, the access terminal 104 may connect to the access point 108 or some other access point.

One or more of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

When the access point 106 (or any other devices in the system 100) uses a first RAT to communicate on a given resource, this communication may be subjected to interference from nearby devices (e.g., the access point 108 and/or the access terminal 104) that use a second RAT to communicate on that resource. For example, communication by the access point 106 via LTE on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context. Moreover, a network or device that provides, adapts, or extends LTE/LTE Advanced in unlicensed spectrum may refer to a network or device that is configured to operate in a contention-based radio frequency band or spectrum.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
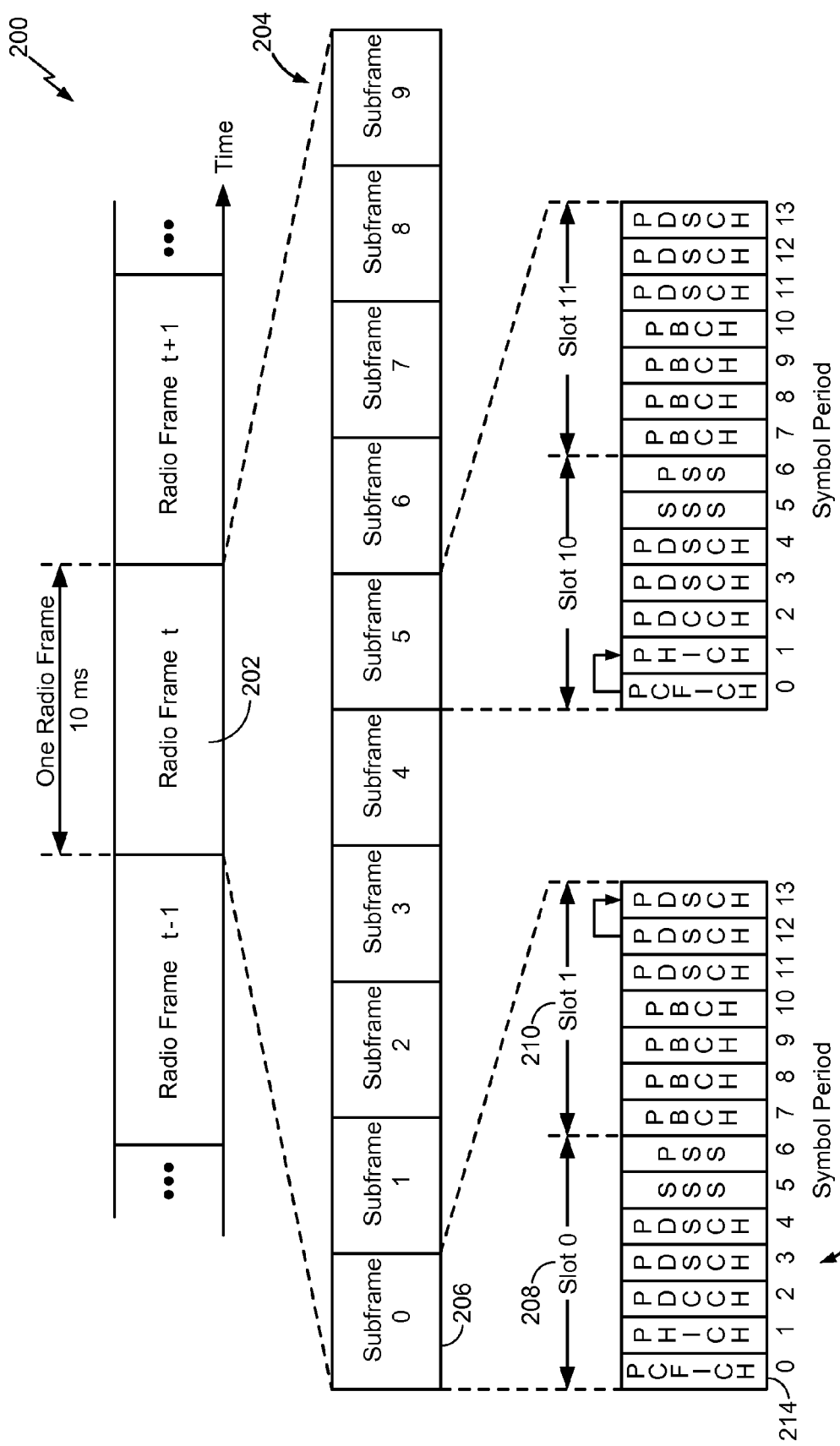
FIG. 2 shows a downlink frame structure used in LTE.
Figure 6:
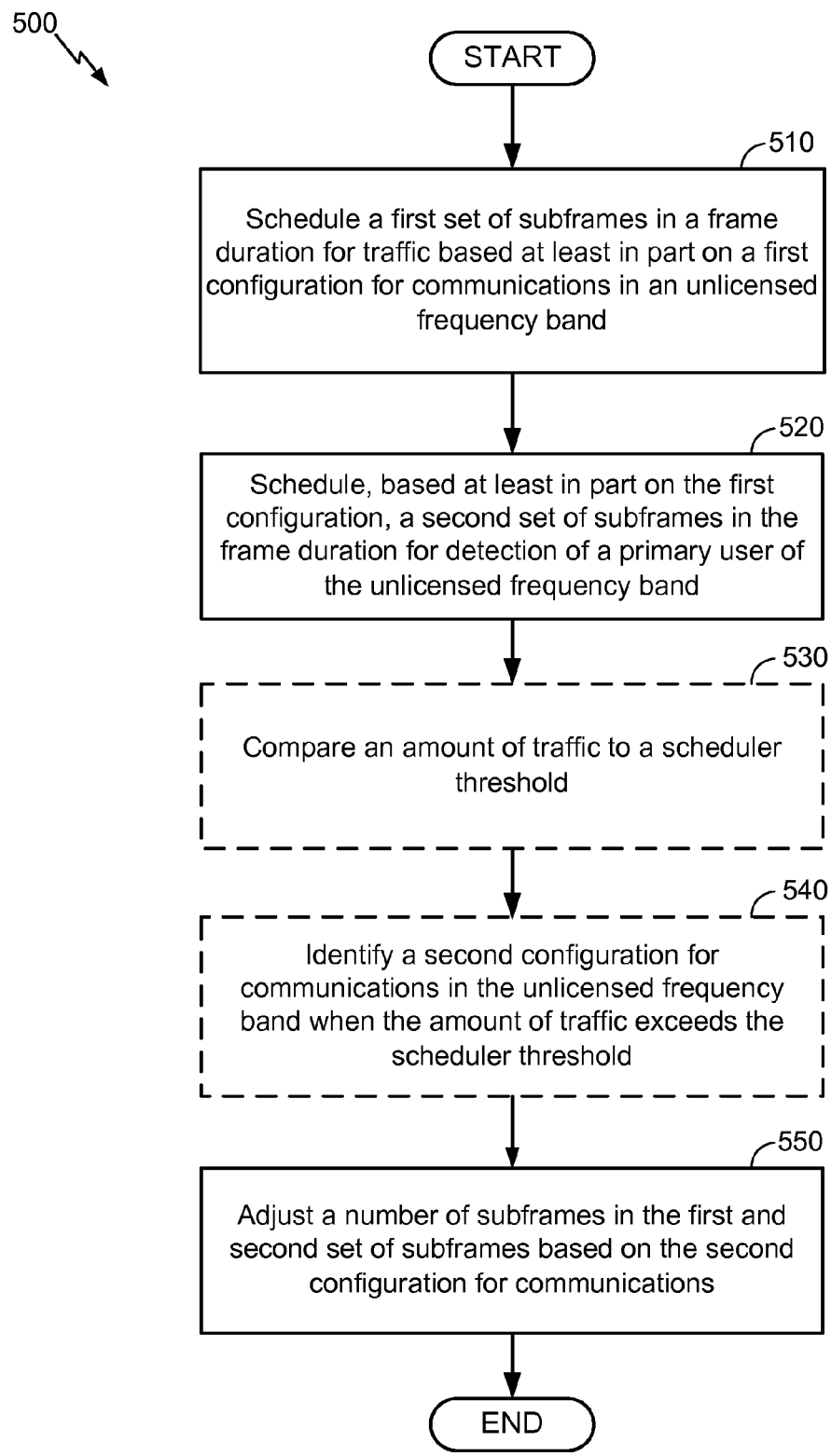
FIG. 6 is a flow diagram illustrating an example method of adaptively using subframes for radar detection.

FIG. 2 shows a downlink frame structure 200 used in LTE. The transmission timeline for the downlink may be partitioned into units of radio frames 202 and 204. Each radio frame may have a predetermined duration (e.g., 10 milliseconds (ms)) and may be partitioned into 10 subframes 206 with indices of 0 through 9. Each subframe may include two slots, e.g., slots 208 and 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, the access point (referred to as an eNB), which may correspond to network entity 404 including subframe component 420 (FIG. 5), may send a Primary Synchronization Signal (PSS) and a Secondary Synchronization Signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by the access terminals (referred to as UEs) for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search. A UE may be within the coverage of multiple eNBs. One of these eNBs may be selected to serve the UE. The serving eNB may be selected based on various criteria such as received power, path loss, signal-to-noise ratio (SNR), etc.

Returning to FIG. 1, the disclosure relates in some aspects to techniques referred to herein as carrier sense adaptive transmission (CSAT), which may be used to facilitate co-existence between different technologies operating on a commonly used resource (e.g., a particular unlicensed RF band or co-channel). The access point 106 includes co-located radios (e.g., transceivers) 112 and 114. The radio 112 uses a second RAT (e.g., LTE) to communicate. The radio 114 is capable of receiving signals using a first RAT (e.g., Wi-Fi). In addition, an interface 116 enables the radios 112 and 114 to communicate with one another.

These co-located radios are leveraged to enable a carrier sense multiple access-like (CSMA-like) mode of operation whereby the radio 114 repeatedly (e.g., periodically) conducts measurements on the co-channel. Based on these measurements, the radio 112 determines the extent to which the co-channel is being utilized by devices operating on the first RAT. The radio 112 is thus able to adapt its communication on the channel (using the second RAT) according to the resource utilization.

For example, if the utilization of the resource by Wi-Fi devices is high, an LTE radio may adjust one or more transmission parameters that the LTE radio uses to communicate via the co-channel such that usage of the co-channel by the LTE radio is reduced. For example, the LTE radio may reduce its transmit duty cycle, transmit power, or frequency allocation.

Conversely, if the utilization of the resource by Wi-Fi devices is low, an LTE radio may adjust one or more transmission parameters that the LTE radio uses to communicate via the co-channel such that usage of the co-channel by the LTE radio is increased. For example, the LTE radio may increase its transmit duty cycle, transmit power, or frequency allocation.

The disclosed scheme may provide several advantages. For example, by adapting communication based on signals associated with the first RAT, the second RAT may be configured to only react to utilization of the co-channel by devices that use the first RAT. Thus, interference by other devices (e.g., non-Wi-Fi devices) or adjacent channel interference may be ignored, if desired. As another example, the scheme enables a device that uses a given RAT to control how much protection is to be afforded to co-channel communications by devices that use another RAT. Also, such a scheme may be implemented in an LTE system without changing the LTE PHY or MAC. For example, these changes may be implemented by simply changing LTE software.

In some aspects, the advantages discussed herein may be achieved by adding a Wi-Fi chip or similar functionality to an LTE access point. If desired, a low functionality Wi-Fi circuit may be employed to reduce costs (e.g., the Wi-Fi circuit simply providing low-level sniffing).

As used herein, the term co-located (e.g., radios, access points, transceivers, etc.) may include in various aspects, one or more of, for example: components that are in the same housing; components that are hosted by the same processor; components that are within a defined distance of one another, or components that are connected via an interface (e.g., an Ethernet switch) where the interface meets the latency requirements of any required inter-component communication (e.g., messaging).

Although aspects of the disclosure are described with respect to carrier sense adaptive transmission, the disclosure need not be so limited. The same and/or different aspects or techniques described herein may, in some instances, be implemented using other mechanisms configured to facilitate co-existence between different technologies operating on a commonly used resource (e.g., unlicensed spectrum).

Figure 3:
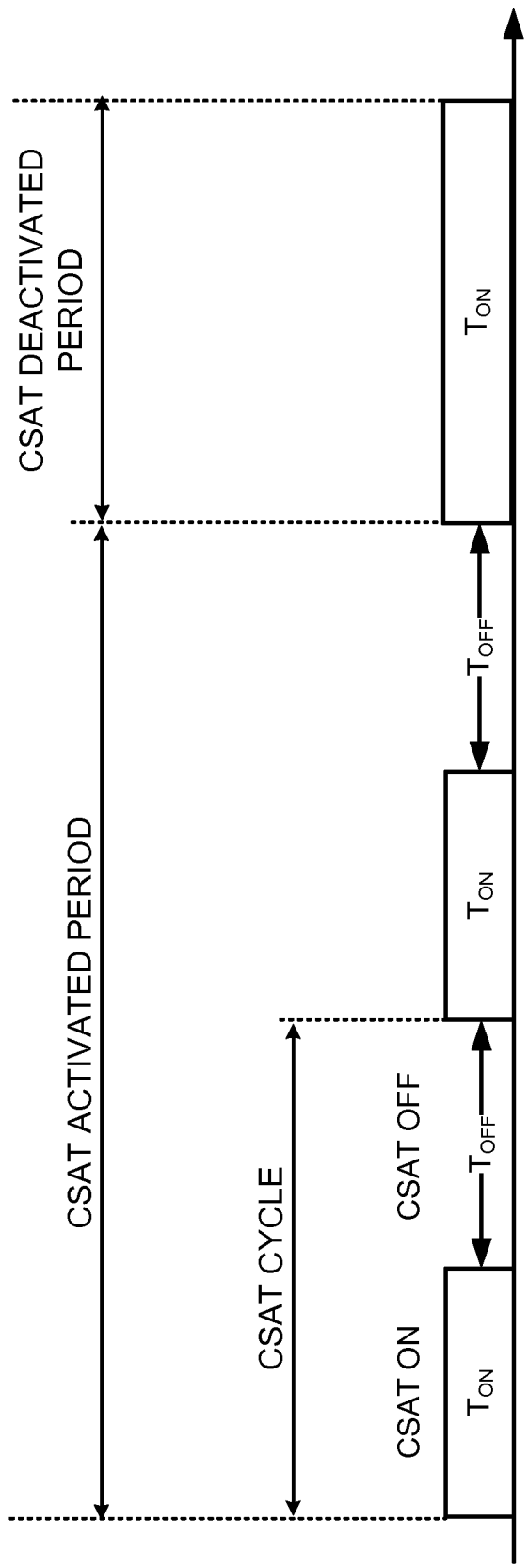
FIG. 3 is a diagram illustrating an example of carrier sense adaptive transmission (CSAT) time division multiplexing (TDM) duty cycling.

FIG. 3 illustrates an example of CSAT Time Division Multiplexed (TDM) duty cycling for LTE in unlicensed spectrum. During time $T_{ON}$, transmission on the unlicensed RF band is enabled, which may be referred to as a CSAT ON period. During time $T_{OFF}$, transmission on the unlicensed RF band is disabled, which may be referred to as a CSAT OFF period, to enable a co-located Wi-Fi radio to conduct measurements. In this way, TDM communication duty cycling for LTE in unlicensed spectrum may be implemented to create adaptable TDM transmission patterns.

Figure 4:
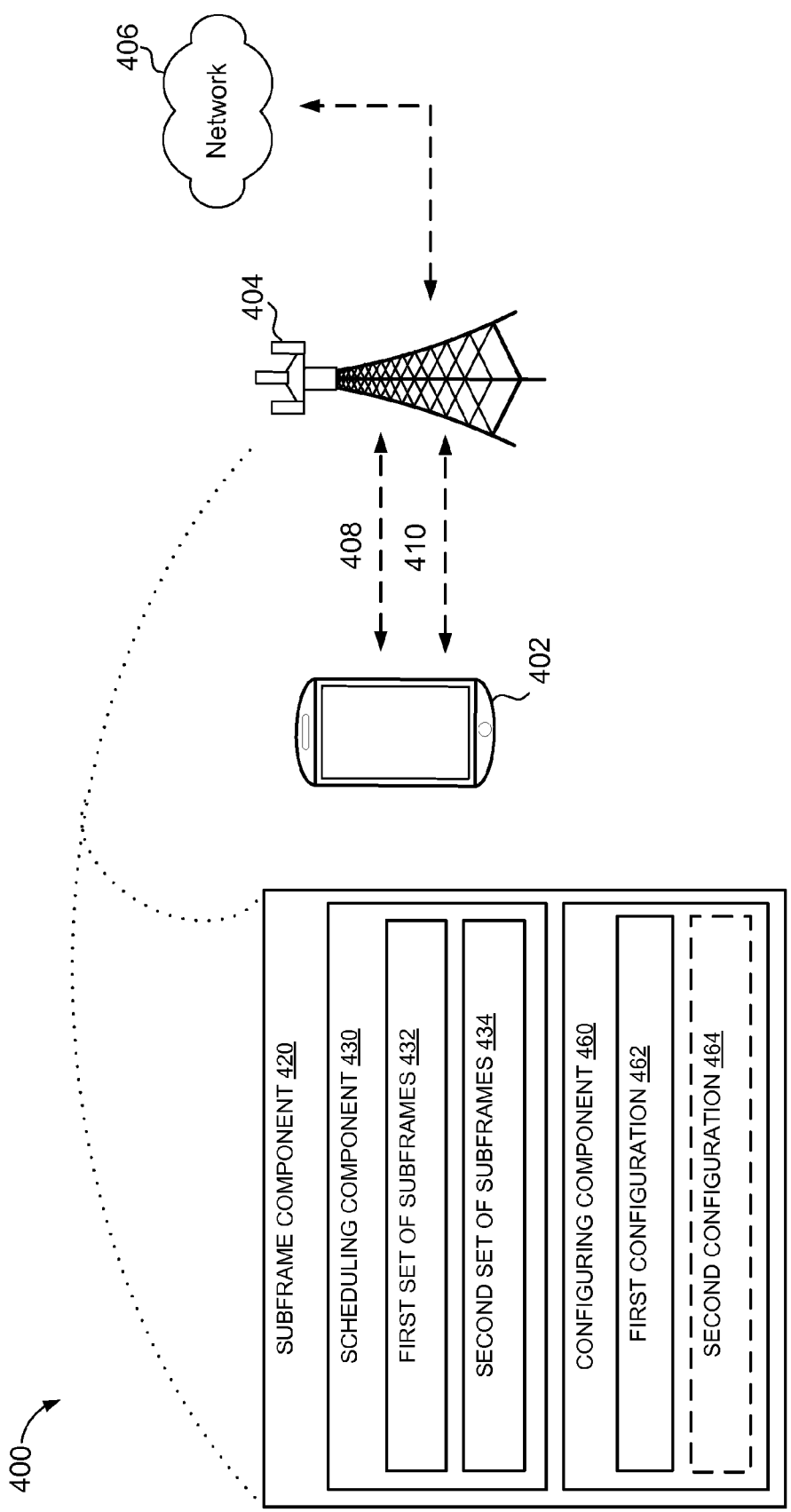
FIG. 4 is schematic diagram illustrating an example of a communication network including an aspect of a network entity that may adaptively use subframes for radar detection.

FIG. 4 is a block diagram conceptually illustrating an example of a telecommunications network system 400 in accordance with an aspect of the present disclosure. Telecommunications network system 400 may include one or more network entities 404, for example, one or more evolved NodeBs (eNodeBs). Each network entity 404 may include subframe component 420, which may be configured to adaptively use subframes for radar detection (e.g., primary user detection) on an unlicensed frequency band. In some instances, the unlicensed frequency band may be considered to be any portion of the radio spectrum (e.g., a portion of a shared channel in the radio spectrum) whose use is not restricted through a spectrum licensing approach. In particular, certain bands in the 5 GHz range are known as the Unlicensed National Information Infrastructure (U-NII). Frequency bands covered by the U-NII include U-NII Low (U-NII-1), U-NII Mid (U-NII-2), U-NII Worldwide, and U-NII Upper (U-NII-3). The frequency range for U-NII Low is 5.15 to 5.25 GHz. With U-NII Low, the use of an integrated antenna may be required, and power is limited to 50 milliwatts (mW). The frequency range for U-NII Mid is 5.25 to 5.35 GHz. With U-NII Mid, a user-installable antenna is allowed, subject to DFS, and power is limited to 250 mW. The frequency range for U-NII Worldwide is 5.47 to 5.725 GHz. With U-NII Worldwide, both outdoor and indoor uses are allowed, subject to DFS, and power is limited to 250 mW. The frequency range for U-NII Upper is 5.725 to 5.825 GHz. With U-NII Upper, a user-installable antenna is allowed, and power is limited to 1 watt.

As such, network entity 404 may be transmitting on an unlicensed frequency band (e.g., U-NII). For example, subframe component 420, which may be included in each network entity 404, may be configured to schedule subframes in a frame duration for traffic and/or radar detection (e.g., primary user detection) based on specific configurations. Such subframe scheduling may be accomplished by one or both of scheduling component 430 and configuring component 460. In some aspects related to LTE, the subframes in a frame may correspond to MBSFN subframes. Further, network entity 404 may communicate with one or more user equipment (UE) 402 via communications channels 408 and/or 410. In some instances, communication channel 408 may correspond to a communication channel operating on a licensed frequency band. Communication channel 410 may correspond to a communication channel operating on an unlicensed frequency band. As such, UE 402 may communicate with network 406 via network entity 404 through communication channels 408 and/or 410. For example, in an aspect, network entity 404 may be a base station configured to transmit and receive one or more signals via one or more communications 408 and/or 410, respectively to/from UE 402.

In an aspect, subframe component 420 may include scheduling component 430, which may be configured to schedule a first set of subframes 432 and a second set of subframes 434. For example, scheduling component 430 may schedule the first set of subframes 432 in a frame duration for traffic based at least in part on a first configuration 462 for communications in the unlicensed frequency band. Further, scheduling component 430 may schedule the second set of subframes 434 in the frame duration for radar detection based at least in part on the first configuration 462.

In some aspects, subframe component 420 may include configuring component 460, which may be configured to adjust a number of subframes in the first set of subframes 432 and the second set of subframes 434 based at least in part on a second configuration 464. In some instances, the second configuration 464 for communications is identified based on a radar type (e.g., a type of primary user). For example, subframe component 420 may compare an amount of traffic to a scheduler threshold to determine whether the amount of traffic scheduled on the first set of subframes 432 exceeds the scheduler threshold. As a result, subframe component 420 may identify the second configuration 464 for communications in the unlicensed frequency band (e.g., communication channel 410) when the amount of traffic exceeds the scheduler threshold.

Moreover, for example, the telecommunications network system 400 may be an LTE network. The telecommunications network system 400 may include a number of evolved NodeBs (eNodeBs) (e.g., network entity 404) and UEs 402 and other network entities. An eNodeB may be a station that communicates with the UEs 402 and may also be referred to as a base station, an access point, etc. A NodeB is another example of a station that communicates with the UEs 402.

Each eNodeB (e.g., network entity 404) may provide communication coverage for a particular geographic area. In 3GPP, the term "cell" can refer to a coverage area of an eNodeB and/or an eNodeB subsystem serving the coverage area, depending on the context in which the term is used.

An eNodeB (e.g., network entity 404) may provide communication coverage for a small cell and/or other types of cell. The term "small cell" (or "small coverage cell"), as used herein, may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. An eNodeB for a macro cell may be referred to as a macro eNodeB. An eNodeB for a pico cell may be referred to as a pico eNodeB. An eNodeB for a femto cell may be referred to as a femto eNodeB or a home eNodeB.

The UEs 402 may be dispersed throughout the telecommunications network system 400, and each UE 402 may be stationary or mobile. For example, the UE 402 may be referred to as a terminal, a mobile station, a subscriber unit, a station, etc. In another example, the UE 402 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 402 may be able to communicate with macro eNodeBs, pico eNodeBs, femto eNodeBs, relays, etc. For example, in FIG. 4, transmissions may occur between a UE 402 and a serving eNodeB (e.g., network entity 404), which is an eNodeB designated to serve the UE 402 on the downlink and/or uplink.

Figure 5:
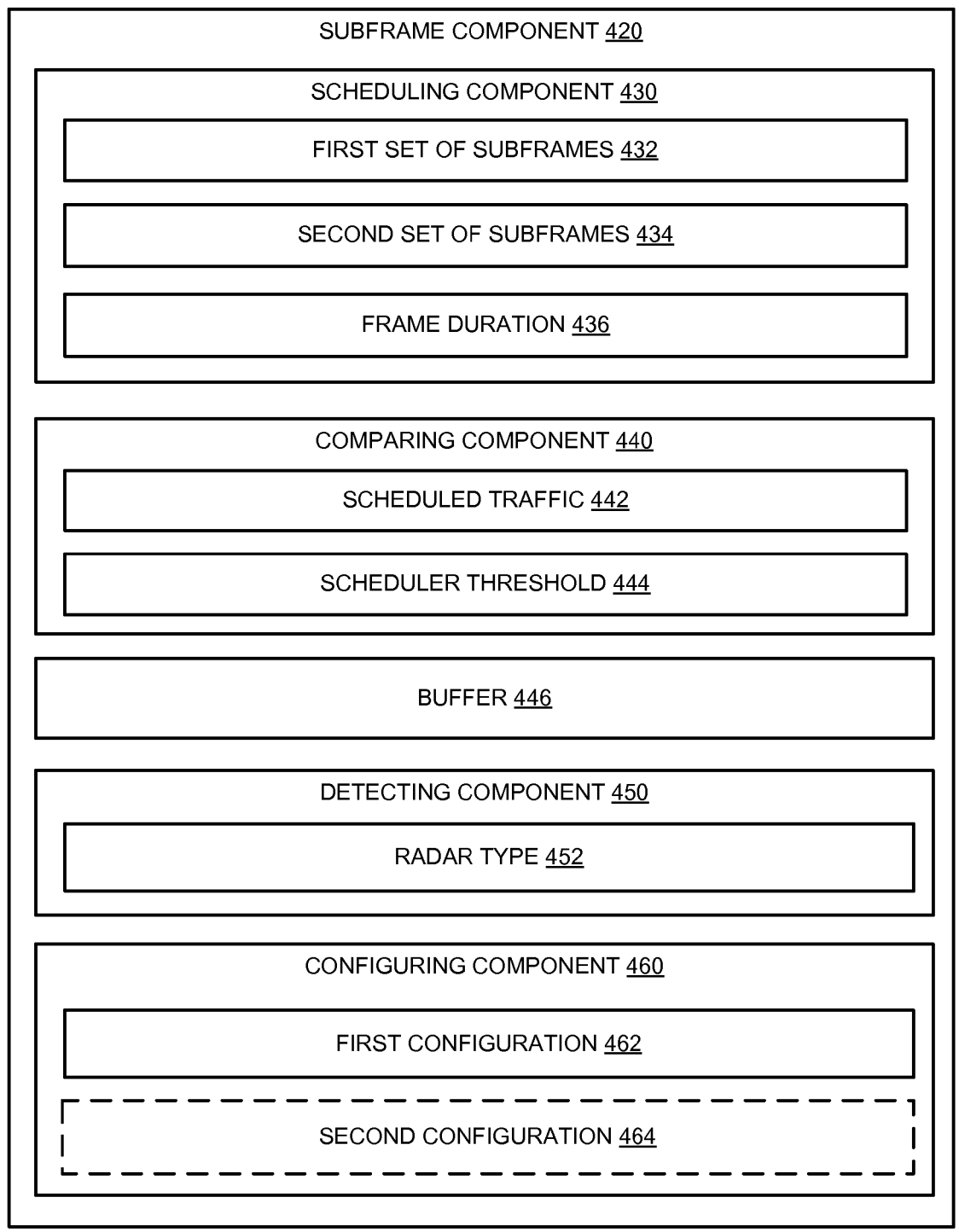
FIG. 5 is a schematic diagram illustrating an example of an aspect of subframe components in a network entity.

Referring to FIG. 5, an aspect of the subframe component 420 may include various components and/or subcomponents, which may be configured to adaptively use subframes for radar detection (e.g., primary user detection) in the unlicensed frequency band. For instance, adapting the subframes to create gaps for periods of time allow for the network entity 404 (FIG. 4) to detect radar without interference from traffic transmitted. The various components/subcomponents described herein enable subframe component 420 to achieve interference free radar detection on the unlicensed frequency band by disabling traffic transmissions on subframes within a frame duration based on one or more configurations. As described above, radar detection may refer to a type of primary user detection that may be performed. Accordingly, subframe component 420 may be generally configured to perform detection of usage of the unlicensed spectrum by a primary user of the unlicensed spectrum.

In an aspect, subframe component 420 may include scheduling component 430, which may be configured to schedule a first set of subframes 432 and a second set of subframes 434 in a frame duration 436. For example, network entity 404, which may include subframe component 420, may be configured, via scheduling component 430, to schedule first set of subframes 432 in a frame duration 436 for traffic based at least in part on a first configuration 462 for communications in an unlicensed frequency band (e.g., communication channel 410 in FIG. 4). A frame duration 436 may refer to a typical LTE frame duration 436 of 10 consecutive subframes of 1 ms each (see e.g., FIG. 2), where such frame duration 436 may overlap two consecutive frames. In some instances, frame duration 436 may comprise 10 consecutive subframes indexed from 0 to 9. In this instance, all 10 subframes are comprised within a single frame. In other instances, frame duration 436 may comprise 10 consecutive subframes indexed from 1 to 0. In this instance, subframes 1-9 are comprised within a first frame while subframe 0 is comprised within the subsequent frame. The subframes are still consecutive even though they are not comprised within the same frame. As such, frame duration 436 may comprise any 10 consecutive subframes (e.g., any 10 consecutive frames from contiguous or adjacent frames). Further, network entity 404, may be configured to, via scheduling component 430, schedule second set of subframes 434 in the frame duration 436 for radar detection based at least in part on first configuration 462. The first set of subframes 432 may comprise any of the subframes within the frame duration 436. In some instances, when frame duration 436 comprises subframes indexed from 0 to 9, the first set of subframes 432 may be configured to include subframes indexed as 0, 4, 5, and 9. In this instance, when two consecutive frame durations 436 occur the subframe indexed as 9 is consecutively followed by subframe indexed as 0 in the subsequent frame duration 436. Since the first set of subframes 432 comprises subframes indexed as 0, 4, 5, and 9, continuous traffic will be scheduled by scheduling component 430 between subframes 9 and 0. Further, the second set of subframes 434 may be configured to include subframes indexed as 1, 2, 3, 6, 7, and 8. As such, continuous radar detection will occur during these subframes and scheduling component 430 may prevent traffic from being scheduled so as to not interfere with radar detection.

In another instance, the UE may not schedule data on the second set of subframes 434 in either the first configuration 462 or the second configuration 464. For example, subframe component 420 may be configured to identify the second set of subframes 434 for performing radar detection. However, instead of the declaring the second set of subframes 434 as MBSFN subframes, subframe component 420 may be configured to not schedule data on the second set of subframes 434 except for scheduling common reference signal (CRS) symbols. For example, LTE-A standardization may require carriers to be backward-compatible, to enable a smooth transition to new releases. However, backward-compatibility may require the carriers to continuously transmit CRS, also may be referred to as (cell-specific reference signals) in every subframe across the bandwidth. Most cell site energy consumption may be caused by the power amplifier since the cell remains on even when only limited control signaling is being transmitted, causing the amplifier to continuously consume energy. CRS may be referred to as LTE's most basic downlink reference signal. For example, CRS may be transmitted in every resource block in the frequency domain and in every downlink subframe. CRS in a cell can be for one, two, or four corresponding antenna ports. CRS may be used by remote terminals to estimate channels for coherent demodulation. A new carrier type may allow temporarily switching off of cells by removing transmission of CRS in four out of five subframes. This reduces power consumed by the power amplifier. It also may reduce the overhead and interference from CRS since the CRS won't be continuously transmitted in every subframe across the bandwidth. In addition, the new carrier type may allow the downlink control channels to be operated using UE-specific demodulation reference symbols. The new carrier type might be operated as a kind of extension carrier along with another LTE/LTE-A carrier or alternatively as standalone non-backward compatible carrier. Scheduling component 430 may blank the remaining symbols in each subframe, and may turn off the power amplifier (PA) in between the CRS symbols transmitted on each subframe in order to avoid noise interference from the PA that impacts radar detection. As a result, the remaining symbol durations for each subframe in the second set of subframes 434 may be available for radar detection.

In another aspect, subframe component 420 may include comparing component 440, which may be configured to compare an amount of scheduled traffic 442 to a scheduler threshold 444. For example, comparing component 440 compares the amount of scheduled traffic 442 for transmission on the first set of subframes 432 to the scheduler threshold 444. The scheduler threshold 444 may be established based at least in part on a full utilization of the first set of subframes 432 and an amount of scheduled traffic 442 in a buffer 446. For instance, the scheduler threshold 444 may correspond to one hundred percent utilization of the first set of subframes 432 and a designated buffering amount. In some instances, scheduling component 430 may schedule traffic 442 on all the subframes within the first set of subframes 432. Moreover, scheduling component 430 may schedule additional traffic 442 causing the additional scheduled traffic 442 to be placed in buffer 446 since the scheduled traffic 442 for the subframes within the first set of subframes 432 has not been transmitted yet. In this instance, comparing component 440 may determine that the amount of scheduled traffic 442 exceeds the scheduler threshold 444. As such, once the amount of scheduled traffic 442 for transmission on the first set of subframes 432 exceeds the scheduler threshold 444, subframe component 420 may identify a second configuration 464 for communications in the unlicensed frequency band. Exceeding the scheduler threshold 444 may indicate that the first configuration 462 is not the optimal configuration for the amount of traffic scheduled for transmission.

In another aspect, subframe component 420 may configure comparing component 440 to determine that the buffer 446 is full of scheduled traffic 442 for transmission on the first set of subframes 432. As a result, subframe component 420 may configure scheduling component 430 to schedule traffic on all subframes in the frame duration 436 in response to determining that the buffer 446 is full of scheduled traffic 442 for transmission on the first set of subframes 432.

In a further aspect, subframe component 420 may include detecting component 450, which may be configured to detect for radar signals and determine the radar type 452. In some instances, radar detection is required on certain channels in 5 GHz. As described above, radar detection may refer to a type of primary user detection that may be performed. Accordingly, subframe component 420 may be generally configured to perform detection of usage of the unlicensed spectrum by a primary user of the unlicensed spectrum. A network entity (e.g., network entity 404 in FIG. 4) operating on a channel (e.g., communication channel 410) requiring radar detection may be required to continue monitoring the channel for radar signals, and cease transmission once radar signals are detected. For example, in some instances, subframe component 420 may initially be operating in a default setting where all subframes within a frame duration 436 are scheduled for transmitting traffic. In this instance, no subframes would be scheduled for radar detection. However, subframe component 420 may be configured, either automatically or manually, to detect for radar signals. Once detecting component 450 detects radar signals it may be configured to determine the radar type 452. The radio types 452 may each have differing pulse patterns comprising three critical parameters: pulse repetition frequency (PRF), pulse width and burst length. In some instances, the radar type 452 may be used by configuring component 460 to configure the first set of subframes 432 and the second set of subframes 434.

In another aspect, subframe component 420 may include configuring component 460, which may be configured to adapt the subframes (e.g., first set of subframes 432 and/or second set of subframes 434) in a frame duration 436 based at least in part on whether the subframes are to be used for traffic or radar detection (e.g., primary user detection). In certain instances, configuring component 460 may configure first set of subframes 432 and second set of subframes 434 based at least in part on first configuration 462. For example, network entity 404 may include subframe component 420, which may be configured to, via configuring component 460, to configure first set of subframes 432 in a frame duration 436 with two sets of two consecutive subframes corresponding to downlink traffic periods, and second set of subframes 434 with two sets of three consecutive subframes corresponding to gap periods for radar detection based at least in part on first configuration 462. For instance, in the first configuration 462 and when frame duration 436 comprises subframes indexed from 0 to 9, subframes indexed as 0, 4, 5, and 9 may be scheduled for traffic, and subframes indexed as 1, 2, 3, 6, 7, and 8 may be scheduled for radar detection.

In some instances, the second configuration 464 may be identified based on one or both of the scheduled traffic 442 exceeding the scheduler threshold 444 and a radar type 452 (e.g., primary user type). In some instances, once the amount of scheduled traffic 442 for transmission on the first set of subframes 432 exceeds the scheduler threshold 444, configuring component 460 may identify a second configuration 464 for communications in the unlicensed frequency band. In other instances, configuring component 460 may adapt subframes based on the detected radar type 452. For example, in certain situations it may be beneficial to adjust the first and second set of subframes, wherein the first set of subframes 432 in the second configuration 464 comprises two sets of three consecutive subframes corresponding to downlink traffic periods, and wherein the second set of subframes 434 in the second configuration 464 comprises two sets of two consecutive subframes corresponding to gap periods for radar detection. Radar detection for certain radar types may benefit from longer continuous periods for when the radar detection is on.

In other instances, the UE may schedule traffic using a different transmission mode such as transmission mode 9 (TM9) and/or transmission mode 10 (TM10). TM9 is designed to help reduce interference between base stations to maximize signal stability and boost performance. The new TM-9 enables the enhancement of network capabilities and performance with minimum addition of overhead. TM9 is designed to combine the advantages of high spectrum efficiency (using higher order MIMO) and cell-edge data rates, coverage and interference management (using beamforming). Flexible and dynamic switching between single-user MIMO (SU-MIMO) and an enhanced version of multi-user MIMO (MU-MIMO) is also provided. TM10 includes a common feedback and signaling framework that can support Coordinated scheduling, or Coordinated Beamforming (CS/CB), Dynamic Point Selection (DPS). These transmission modes may use UE specific reference signals (RSs) (also known as demodulation RS (DMRS)), or channel state information RS (CSI-RS). DMRS in uplink transmission may be used for channel estimation and for coherent demodulation which comes along with Physical Uplink Shared Channel (PUSCH) and Physical Uplink Control Channel (PUCCH). CSI-RS may be used by the UE 402 to estimate the channel and report channel quality information (CQI) to the network entity 404. As such, it may be beneficial to adjust the first and second set of subframes, wherein the first set of subframes 432 in the second configuration 464 comprises two sets of two consecutive subframes and two sets of nonconsecutive subframes corresponding to downlink traffic periods, and wherein the second set of subframes 434 in the second configuration 464 comprises four nonconsecutive subframes corresponding to gap periods for radar detection. Radar detection for certain radar types may benefit from shorter continuous periods for when the radar detection is on.

Figure 7:
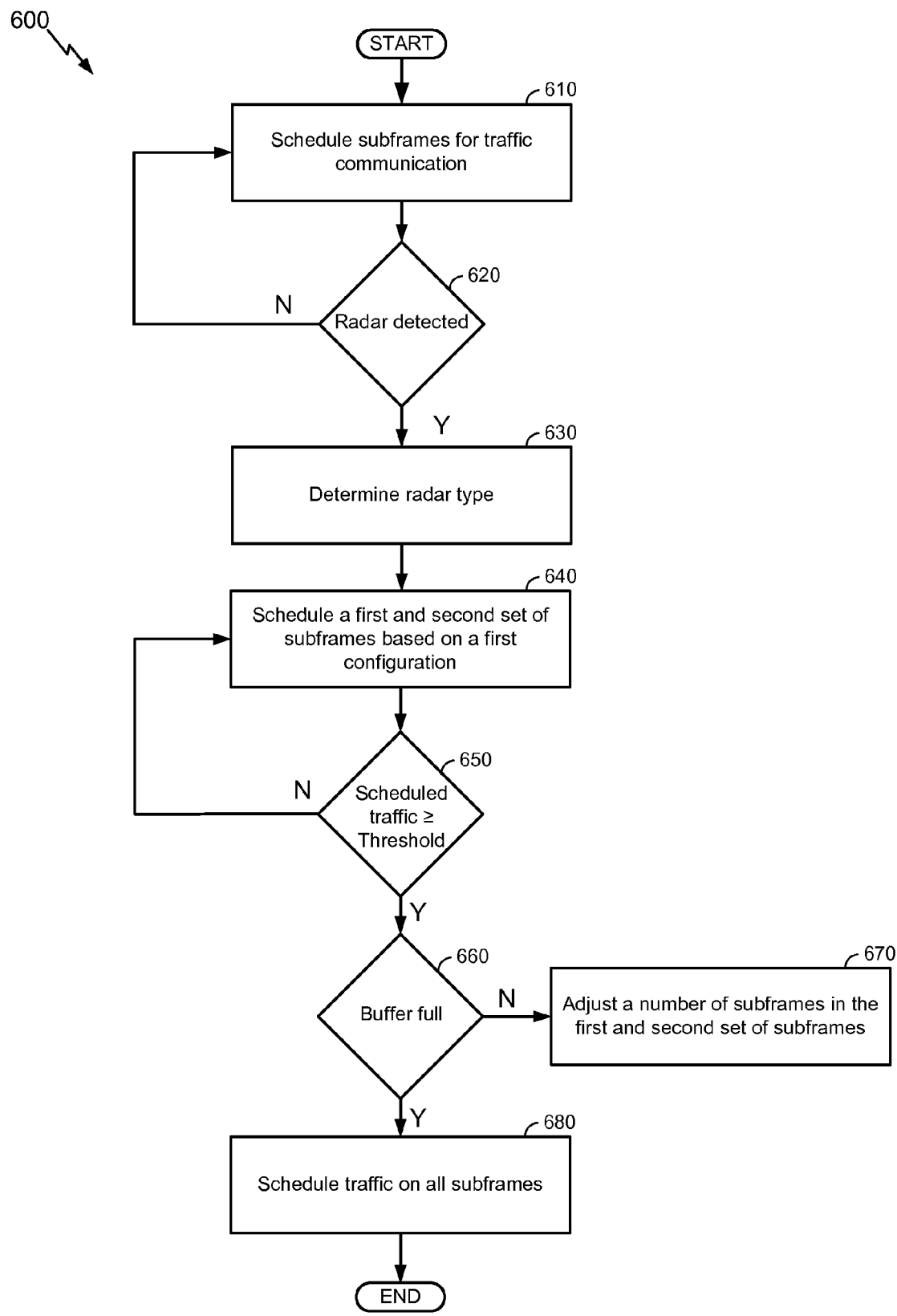
FIG. 7 is a flow diagram illustrating another example method of adaptively using subframes for radar detection.

Referring to FIGS. 6 and 7, in operation, a network entity such as network entity 404 (FIG. 4) may perform an aspect of methods 500 and/or 600 for adaptively using subframes for radar detection (e.g., detection of a primary user). While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

Referring to FIG. 6, in an aspect, at block 510, method 500 includes scheduling a first set of subframes in a frame duration for traffic based at least in part on a first configuration for communications in an unlicensed frequency band. For example, as described herein, subframe component 420 may include scheduling component 430 (FIG. 5) to schedule first set of subframes 432 in a frame duration 436 for traffic based at least in part on a first configuration 462 for communications in an unlicensed frequency band (e.g., communication channel 410).

At block 520, method 500 includes scheduling, based at least in part on the first configuration, a second set of subframes in the frame duration for detection of a primary user of the unlicensed frequency band (e.g., radar detection). For example, as described herein, subframe component 420 may include scheduling component 430 (FIG. 5) to schedule a second set of subframes 434 in the frame duration 436 for radar detection based at least in part on the first configuration 462.

Further, at block 530, method 500 optionally includes comparing an amount of traffic to a scheduler threshold. For example, as described herein, subframe component 420 may include comparing component 440 (FIG. 5) to compare an amount of scheduled traffic 442 to a scheduler threshold 444.

At block 540, method 500 optionally includes identifying a second configuration for communications in the unlicensed frequency band when the amount of traffic exceeds the scheduler threshold. For example, as described herein, subframe component 420 may include configuring component 460 (FIG. 5) to identify a second configuration 464 for communications in the unlicensed frequency band (e.g., communication channel 410) when the amount of scheduled traffic 442 exceeds the scheduler threshold 444. In some instances, identifying a second configuration 464 for communications in the unlicensed frequency band when the amount of traffic exceeds the scheduler threshold 444 may be based on radar type 452 (e.g., type of a primary user of the unlicensed frequency band).

Additionally, at block 550, method 500 includes adjusting a number of subframes in the first and second set of subframes based at least in part on the second configuration. For example, as described herein, subframe component 420 may include configuring component 460 (FIG. 5) to adjust a number of subframes in the first set of subframes 432 and second set of subframes 434 based at least in part on the second configuration 464.

Referring to FIG. 7, in an aspect, at block 610, method 600 includes scheduling subframes for traffic communication. For example, as described herein, subframe component 420 may include scheduling component 430 (FIG. 5) to schedule subareas for traffic communication. In some instances, all subframes of a frame duration 436 may be scheduled for traffic communication.

Further, at block 620, method 600 includes detecting radar signals. For example, as described herein, subframe component 420 may include detecting component 450 (FIG. 5) to detecting for radar signals. As described above, detection of radar signals may correspond to the detection of usage of a shared channel by a primary user of that shared channel. If detecting component 450 does not detect radar signals, then method 600 returns to block 610. However, if detecting component 450 detects radar signals, then method 600 proceeds to block 630.

At block 630, method 600 includes determining radar type. For example, as described herein, subframe component 420 includes detecting component 450 (FIG. 5) to determine the radar type 452 (e.g., type of primary user) of the detected radar signals.

In another aspect, at block 640, method 600 includes scheduling a first and second set of subframes based on a first configuration. For example, as described herein, subframe component 420 may include scheduling component 430 (FIG. 5) to schedule a first set of subframes 432 and a second set of subframes 434 in a frame duration 436 based on a first configuration 462. The first configuration 462 may be identified based on detecting component 450 determining a radar type 452 of the detected radar signals.

Moreover, at block 650, method 600 includes determining whether the scheduled traffic is greater than or equal to the scheduler threshold. For example, as described herein, subframe component 420 may include comparing component 440 (FIG. 5) to determining whether the scheduled traffic 442 of the subframes in the first set of subframes 432 is greater than or equal to the scheduler threshold 444. If comparing component 440 determines that the scheduled traffic 442 of the subframes in the first set of subframes 432 is not greater than or equal to the scheduler threshold 444 then method 600 returns to block 640. However, if the scheduled traffic 442 of the subframes in the first set of subframes 432 is greater than or equal to the scheduler threshold 444 then method 600 proceeds to block 660.

At block 660, method 600 includes determining whether the buffer is full. For example, as described herein, subframe component 420 may include comparing component 440 (FIG. 5) to determine whether buffer 446 is full. If comparing component 440 determines that the buffer 446 is not full then method 600 proceeds to block 670.

At block 670, method 600 includes adjusting a number of subframes in the first and second set of subframes. For example, as described herein, subframe component 420 may include configuring component 460 (FIG. 5) to adjust a number of subframes in the first set of subframes 432 and second set of subframes 434 based at least in part on the second configuration 464.

However, if comparing component 440 determines that the buffer 446 is full then method 600 proceeds to block 680. At block 680, method 600 includes scheduling traffic on all subframes. For example, as described herein, subframe component 420 may include scheduling component 430 (FIG. 5) to schedule traffic 442 on all subframes of the frame duration 436.

Figure 8A:
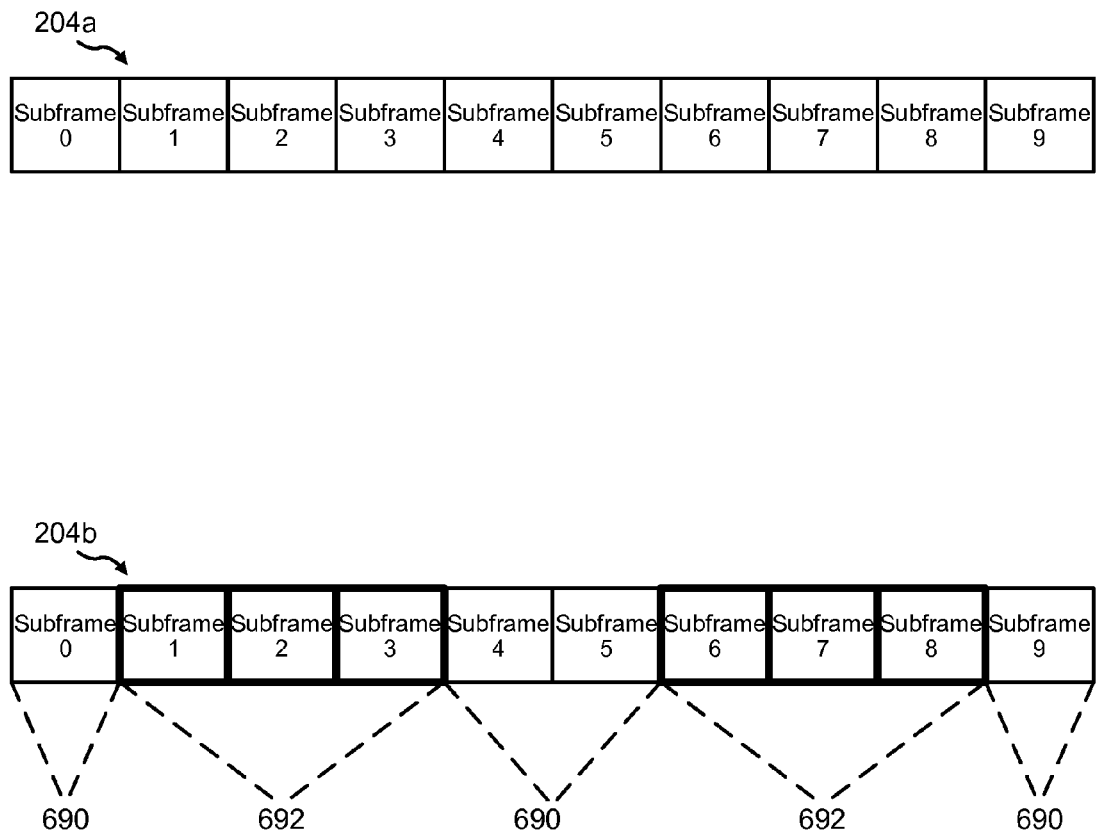
FIGS. 8A-8B are conceptual diagrams illustrating an example of adaptively using subframes for radar detection.
Figure 8B:
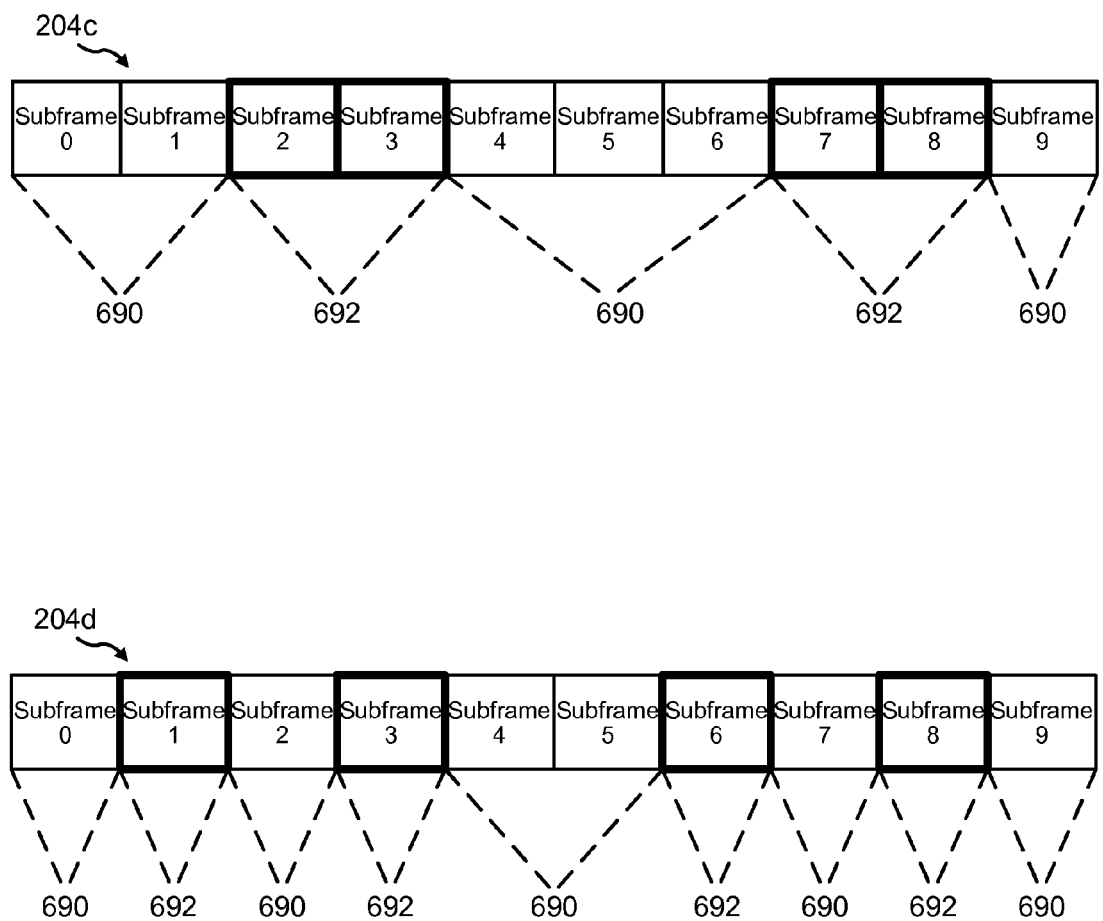

FIGS. 8A and 8B, in an aspect, provide conceptual diagrams illustrating the scheduling of the first and second set of subframes in a frame duration 436, corresponding to frames 202 and 204 of FIG. 2, based at least in part on a first configuration and a second configuration by a network entity, such as network entity 404 comprising subframe component 420 (FIG. 5). For example, in FIG. 8A, frame 204a comprises 10 subframes with indices of 0 through 9. Frame 204a may have a predetermined duration, such as 10 ms. Similarly, subframes 0 through 9 may have durations of 1 ms each. As shown, no subframes are currently scheduled for traffic and/or radar detection. As described above, detection of radar signals may correspond to the detection of usage of a shared channel by a primary user of that shared channel. In some instances, when subframe component 420 schedules first and second set of subframes (e.g., first set of subframes 432 and second set of subframes 434) based on a first configuration 462, frame 204*a* is adapted to correspond to frame 204*b*. For example, frame 204*b* may comprise a first set of subframes 690 scheduled for traffic and a second set of subframes 692 scheduled for radar detection.

In one aspect, the first set of subframes 690 scheduled for traffic may comprise subframes 0, 4, 5, and 9, and the second set of subframes 692 scheduled for radar detection may comprise subframes 1, 2, 3, 6, 7, and 8. As such, subframes 0, 4, 5, and 9 may be configured to serve downlink traffic as much as possible up to a scheduler threshold 444. On the contrary, subframes 1, 2, 3, 6, 7, and 8 may not have a CRS. Thus, network entity 404 and/or subframe component 420 may be scheduled for radar detection on subframes 1, 2, 3, 6, 7, and 8. As can be seen, first set of subframes 690 provides two sets of two consecutive frames including a first set with subframe 9 followed by subframe 0, and a second set with subframe 4 followed by subframe 5. Likewise, second set of subframes 692 provides two sets of three consecutive subframes (e.g., the first set comprising subframes 1, 2, and 3, and the second set comprising subframes 6, 7, and 8).

In another aspect, in FIG. 8B, when a second configuration is employed, subframe component 420 and/or configuring component 460 may adapt frame 204*b* to correspond to either frame 204*c* and/or frame 204*d*. For instance, in frame 204*c*, the first set of subframes 690 may be adjusted to include subframes 0, 1, 4, 5, 6, and 9, and the second set of subframes 692 may be adjusted to include subframes 2, 3, 7, and 8. As such, subframes 0, 1, 4, 5, 6, and 9 may be configured to serve downlink traffic as much as possible up to a scheduler threshold 444. On the contrary, subframes 2, 3, 7, and 8 may not have a CRS. Thus, network entity 404 and/or subframe component 420 may schedule radar detection on subframes 2, 3, 7, and 8. As described above, detection of radar signals may correspond to the detection of usage of a shared channel by a primary user of that shared channel. As can be seen, first set of subframes 690 provides two sets of three consecutive subframes corresponding to downlink traffic periods (e.g., the first set comprising subframes 9, 0, and 1, and the second set comprising subframes 4, 5, and 6). As a result, subframe 9 will precede subframe 0 in the frame duration 436 and thus two consecutive subframes will be formed corresponding to downlink traffic periods. Likewise, second set of subframes 692 provides two sets of two consecutive subframes (e.g., the first set comprising subframes 2 and 3, and the second set comprising subframes 7 and 8).

In some instances, the UE may schedule traffic using a different transmission mode such as TM9 and/or TM10. These transmission modes may use UE specific RSs (also known as DMRS or CSI-RS). As such, in frame 204*d*, the first set of subframes 690 may be adjusted to include subframes 0, 2, 4, 5, 7, and 9, and the second set of subframes 692 may be adjusted to include subframes 1, 3, 6, and 8. As such, subframes 0, 2, 4, 5, 7, and 9 may be configured to serve downlink traffic using TM9 and/or TM10 as much as possible up to a scheduler threshold 444. On the contrary, subframes 1, 3, 6, and 8 may not have a CRS. Thus, network entity 404 and/or subframe component 420 may be scheduled for radar detection on subframes 1, 3, 6, and 8. As can be seen, first set of subframes 690 provides two sets of two consecutive subframes corresponding to downlink traffic periods in instances where the frame duration 436 does not begin at subframe 0 (e.g., the first set comprising subframes 9 and 0, and the second set comprising subframes 5 and 6) and two sets of nonconsecutive subframes (e.g., subframes 2 and 7). As a result, subframe 9 will precede subframe 0 in the frame duration 436 and thus two consecutive subframes will be formed corresponding to downlink traffic periods. Likewise, second set of subframes 692 provides four sets of nonconsecutive subframes (e.g., subframes 1, 3, 6, and 8).

Figure 9:
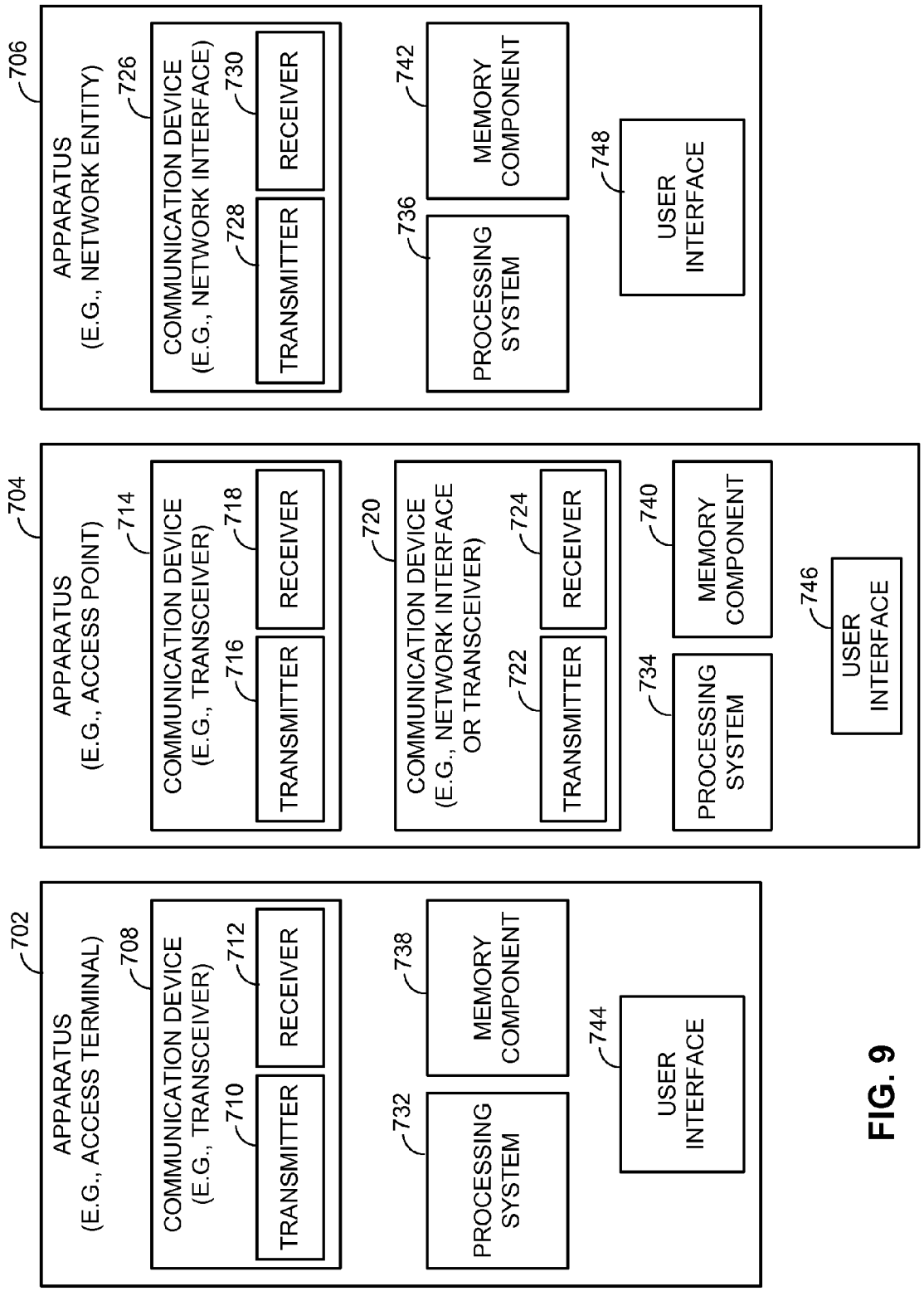
FIG. 9 is a simplified block diagram of several sample aspects of components that may be employed in communication nodes.

FIG. 9 illustrates several sample components (represented by corresponding blocks) that may be incorporated into an apparatus 702, which may correspond to UE 402 (FIG. 4), and an apparatus 704 and an apparatus 706 (e.g., corresponding to an access terminal, an access point, and a network entity, respectively), both of which may correspond to network entity 404 including subframe component 420 (FIG. 5), to support communication adaptation operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 702 and the apparatus 704 each include at least one wireless communication device (represented by the communication devices 708 and 714 (and the communication device 720 if the apparatus 704 is a relay)) for communicating with other nodes via at least one designated radio access technology. Each communication device 708 includes at least one transmitter (represented by the transmitter 710) for transmitting and encoding signals (e.g., messages, indications, information, and so on) and at least one receiver (represented by the receiver 712) for receiving and decoding signals (e.g., messages, indications, information, pilots, and so on). Similarly, each communication device 714 includes at least one transmitter (represented by the transmitter 716) for transmitting signals (e.g., messages, indications, information, pilots, and so on) and at least one receiver (represented by the receiver 718) for receiving signals (e.g., messages, indications, information, and so on). If the apparatus 704 is a relay access point, each communication device 720 may include at least one transmitter (represented by the transmitter 722) for transmitting signals (e.g., messages, indications, information, pilots, and so on) and at least one receiver (represented by the receiver 724) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 704 comprises a network listen module.

The apparatus 706 (and the apparatus 704 if it is not a relay access point) includes at least one communication device (represented by the communication device 726 and, optionally, 720) for communicating with other nodes. For example, the communication device 726 may comprise a network interface that is configured to communicate with one or more network entities via a wire-based or wireless backhaul. In some aspects, the communication device 726 may be implemented as a transceiver configured to support wire-based or wireless signal communication. This communication may involve, for example, sending and receiving: messages, parameters, or other types of information. Accordingly, in the example of FIG. 9, the communication device 726 is shown as comprising a transmitter 728 and a receiver 730. Similarly, if the apparatus 704 is not a relay access point, the communication device 720 may comprise a network interface that is configured to communicate with one or more network entities via a wire-based or wireless backhaul. As with the communication device 726, the communication device 720 is shown as comprising a transmitter 722 and a receiver 724.

The apparatuses 702, 704, and 706 also include other components that may be used in conjunction with communication adaptation operations as taught herein. The apparatus 702 includes a processing system 732 for providing functionality relating to, for example, communicating with an access point to support communication adaptation as taught herein and for providing other processing functionality. The apparatus 704 includes a processing system 734 for providing functionality relating to, for example, communication adaptation as taught herein and for providing other processing functionality. The apparatus 706 includes a processing system 736 for providing functionality relating to, for example, communication adaptation as taught herein and for providing other processing functionality. The apparatuses 702, 704, and 706 include memory devices 738, 740, and 742 (e.g., each including a memory device), respectively, for maintaining information (e.g., information indicative of reserved resources, thresholds, parameters, and so on). In addition, the apparatuses 702, 704, and 706 include user interface devices 744, 746, and 748, respectively, for providing indications (e.g., audible and/or visual indications) to a user and/or for receiving user input (e.g., upon user actuation of a sensing device such a keypad, a touch screen, a microphone, and so on).

For convenience, the apparatus 702 is shown in FIG. 9 as including components that may be used in the various examples described herein. In practice, the illustrated blocks may have different functionality in different aspects.

The components of FIG. 9 may be implemented in various ways. In some implementations, the components of FIG. 9 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 708, 732, 738, and 744 may be implemented by processor and memory component(s) of the apparatus 702 (e.g., by execution of appropriate code and/or by appropriate configuration of processor components). Similarly, some or all of the functionality represented by blocks 714, 720, 734, 740, and 746 may be implemented by processor and memory component(s) of the apparatus 704 (e.g., by execution of appropriate code and/or by appropriate configuration of processor components). Also, some or all of the functionality represented by blocks 726, 736, 742, and 748 may be implemented by processor and memory component(s) of the apparatus 706 (e.g., by execution of appropriate code and/or by appropriate configuration of processor components).

Some of the access points referred to herein may comprise low-power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 10:
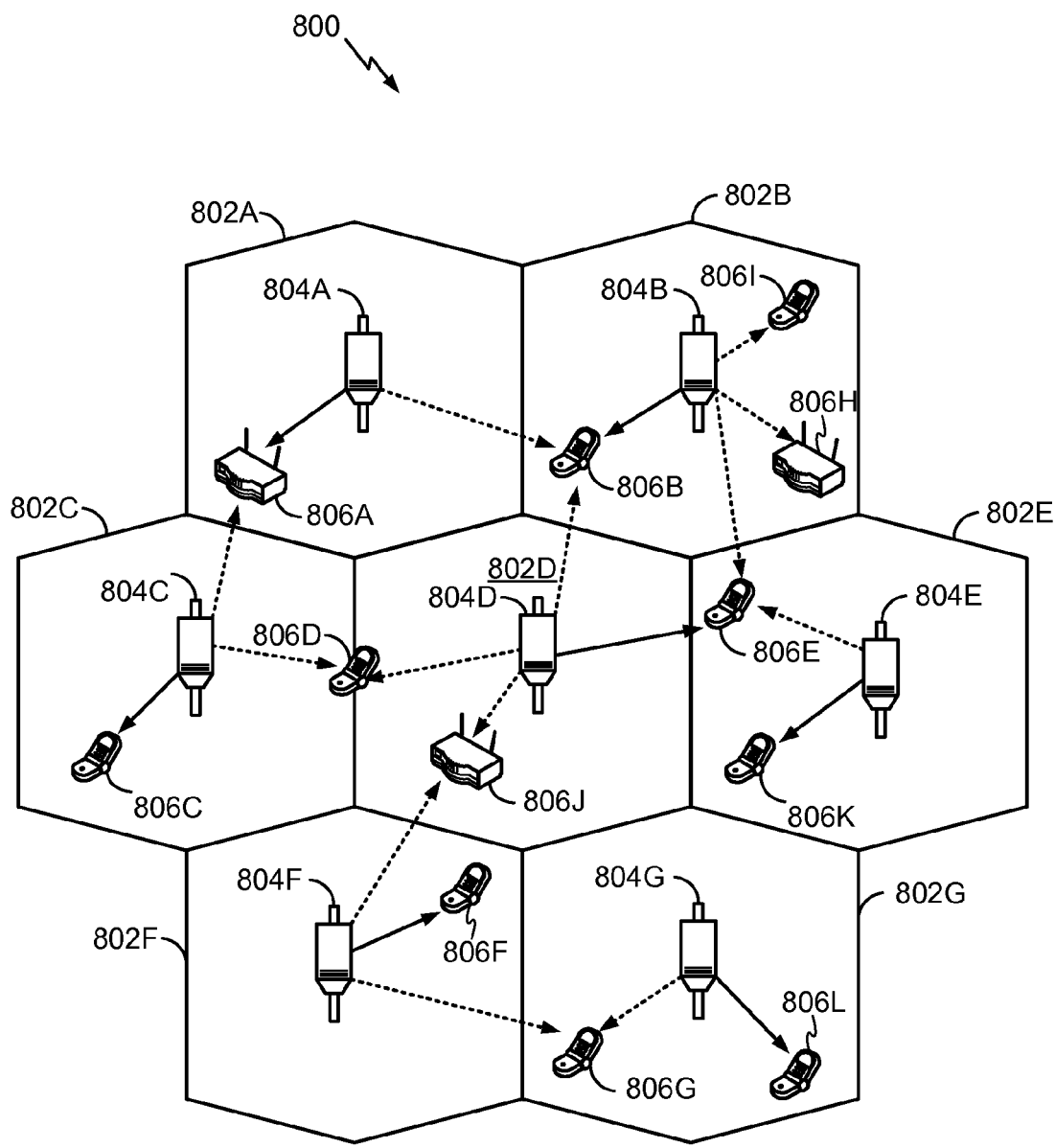
FIG. 10 is a simplified diagram of a wireless communication system.

FIG. 10 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G), which may correspond to network entity 404 including subframe component 420 (FIG. 5). As shown in FIG. 10, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in a rural environment.

Figure 11:
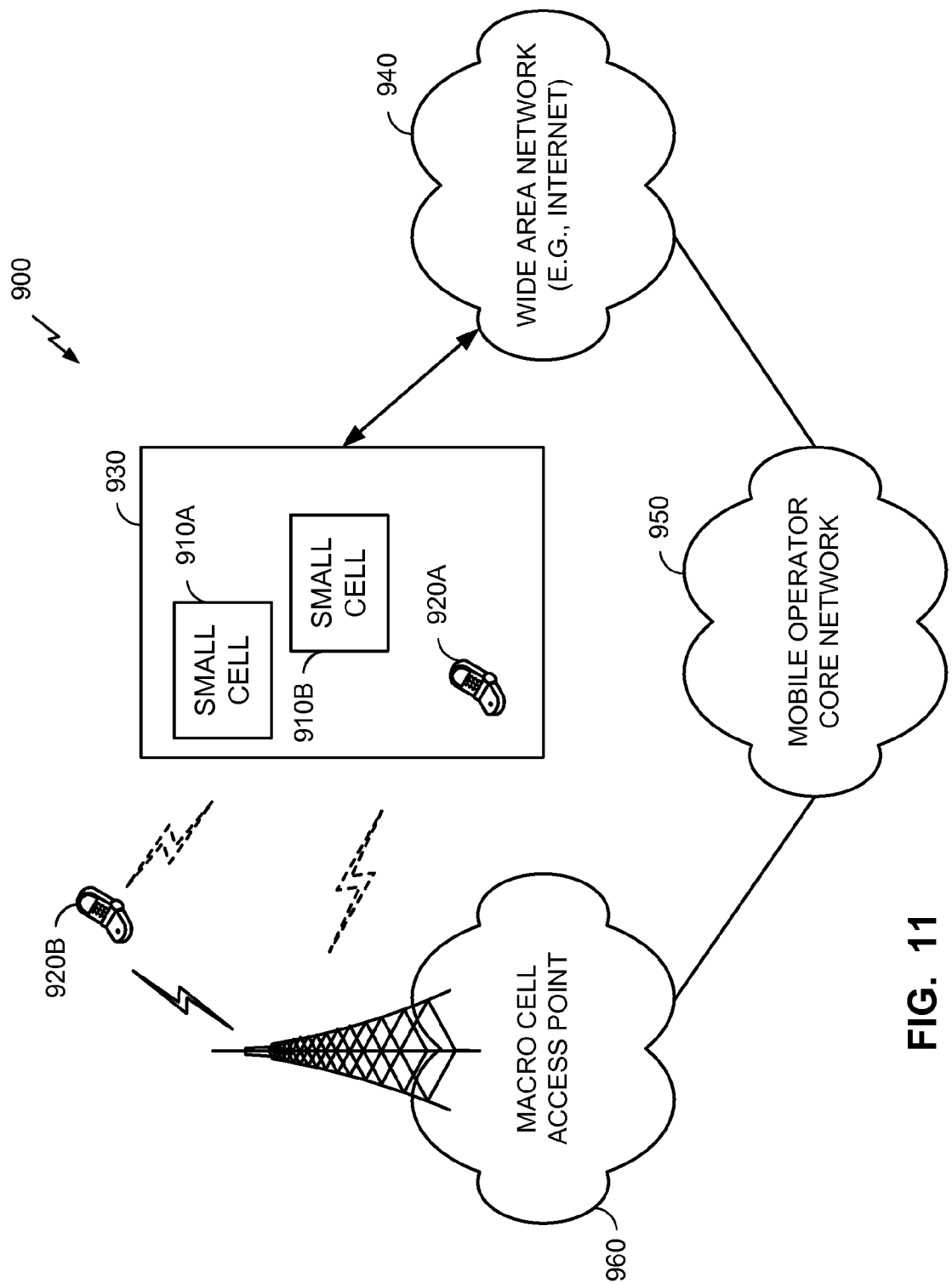
FIG. 11 is a simplified diagram of a wireless communication system including small cells.

FIG. 11 illustrates an example of a communication system 900 where one or more small cells are deployed within a network environment. Specifically, the system 900 includes multiple small cells 910 (e.g., small cells 910A and 910B), which may correspond to network entity 404 including subframe component 420 (FIG. 5), installed in a relatively small scale network environment (e.g., in one or more user residences 930). Each small cell 910 may be coupled to a wide area network 940 (e.g., the Internet) and a mobile operator core network 950 via a DSL router, a cable modem, a wireless link, or other connectivity means (not shown). As will be discussed below, each small cell 910 may be configured to serve associated access terminals 920 (e.g., access terminal 920A) and, optionally, other (e.g., hybrid or alien) access terminals 920 (e.g., access terminal 920B). In other words, access to small cells 910 may be restricted whereby a given access terminal 920 may be served by a set of designated (e.g., home) small cell(s) 910 but may not be served by any non-designated small cells 910 (e.g., a neighbor's small cell 910).

Figure 12:
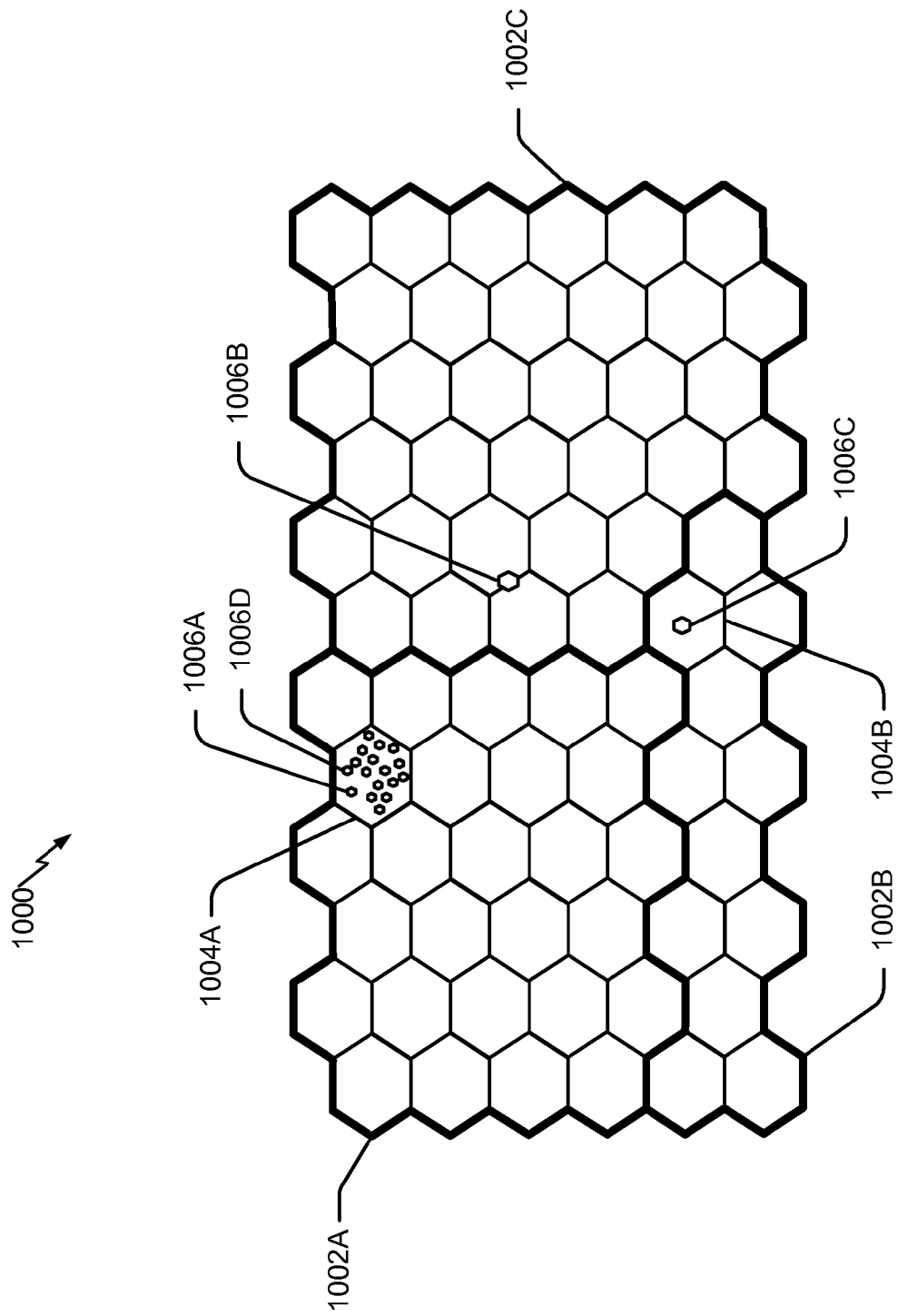
FIG. 12 is a simplified diagram illustrating coverage areas for wireless communication.

FIG. 12 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 might not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 11, the owner of a small cell 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of small cells 910 (e.g., the small cells 910A and 910B that reside within a corresponding user residence 930). For example, when a subscriber is outside his home, he is served by a standard macro access point (e.g., access point 960) and when the subscriber is at home, he is served by a small cell (e.g., small cell 910A). Here, a small cell 910 may be backward compatible with legacy access terminals 920.

A small cell 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred small cell (e.g., the home small cell of the access terminal 920) whenever such connectivity is possible. For example, whenever the access terminal 920A is within the user's residence 930, it may be desired that the access terminal 920A communicate only with the home small cell 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred small cell 910) using a better system reselection (BSR) procedure, which may involve a periodic scanning of available systems to determine whether better systems are currently available and subsequently acquire such preferred systems. The access terminal 920 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 910, the access terminal 920 selects the small cell 910 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 910 that reside within the corresponding user residence 930). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., emergency-911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
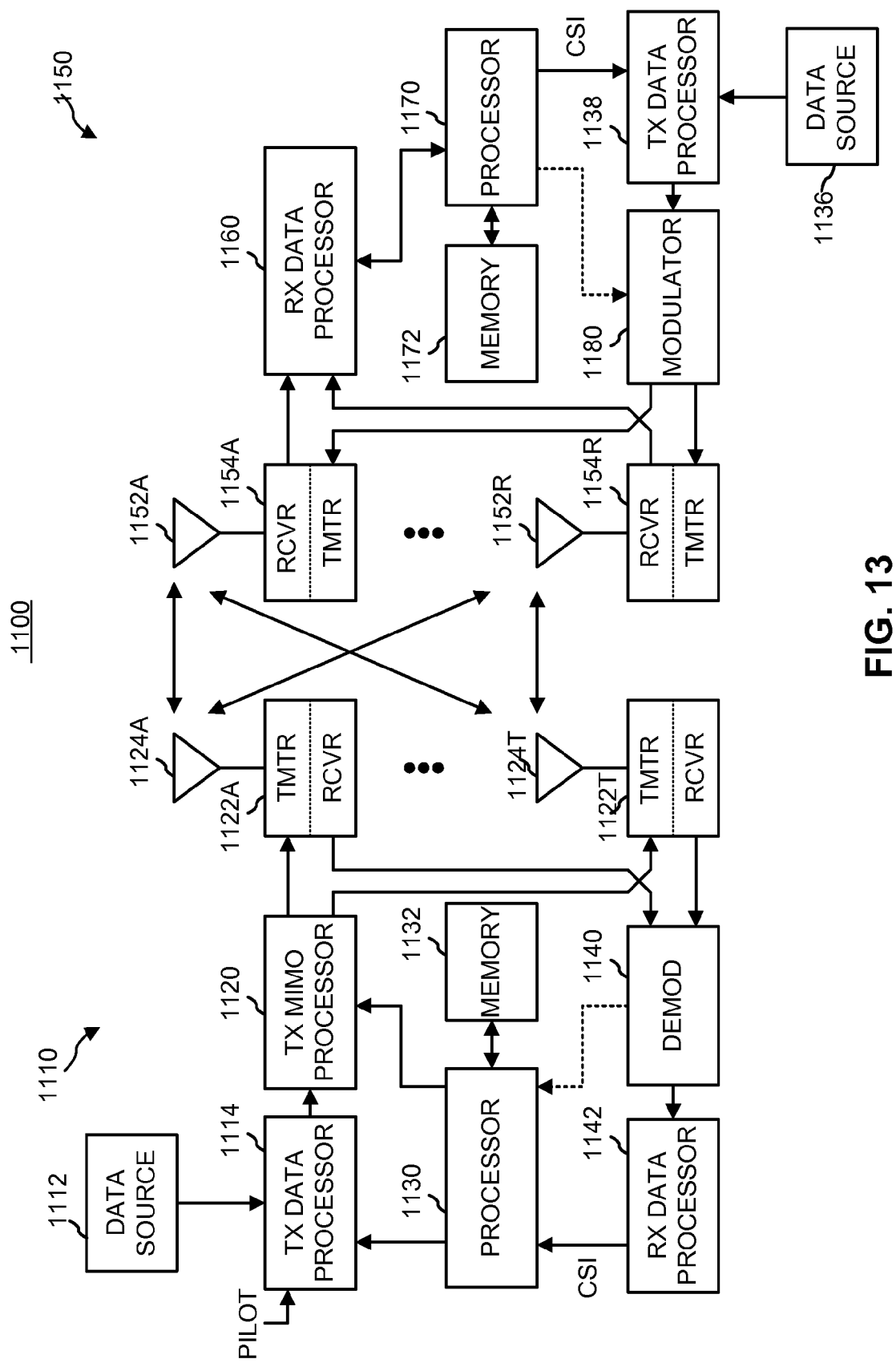
FIG. 13 is a simplified block diagram of several sample aspects of communication components.

FIG. 13 illustrates in more detail the components of a wireless device 1110 (e.g., a small cell AP), which may correspond to network entity 404 including subframe component 420 (FIG. 5), and a wireless device 1150 (e.g., a UE) of a sample communication system 1100 that may be adapted as described herein. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides NT modulation symbol streams to NT transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which precoding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

It will be appreciated that for each device 1110 and 1150 the functionality of two or more of the described components may be provided by a single component. It will be also be appreciated that the various communication components illustrated in FIG. 11 and described above may be further configured as appropriate to perform communication adaptation as taught herein. For example, the processors 1130/1170 may cooperate with the memories 1132/1172 and/or other components of the respective devices 1110/1150 to perform the communication adaptation as taught herein.

Figure 14:
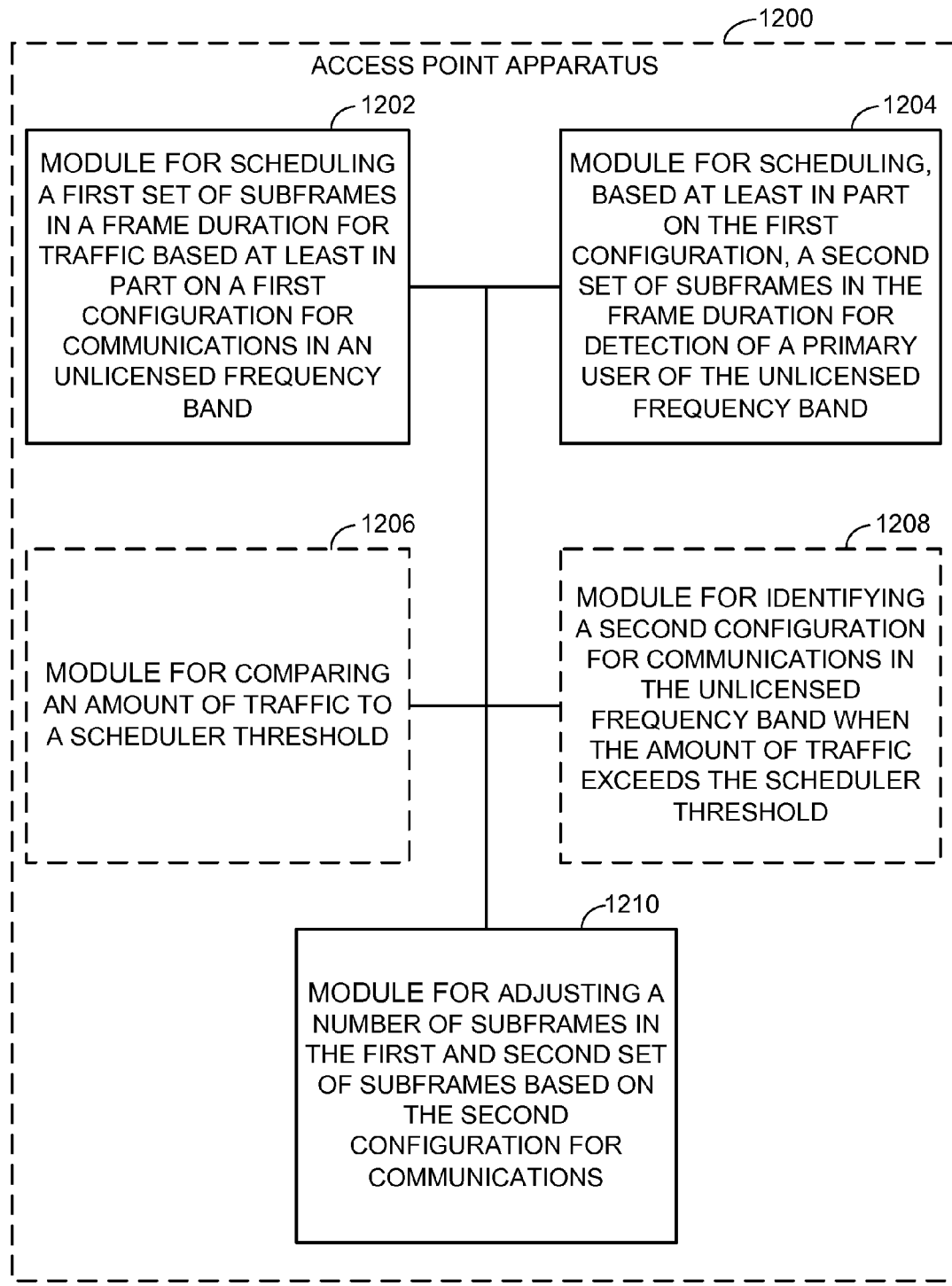
FIG. 14 is a simplified block diagram of several sample aspects of apparatuses configured to support communication as taught herein.

FIG. 14 illustrates an example access point apparatus 1200 represented as a series of interrelated functional modules. A module for scheduling a first set of subframes in a frame duration for traffic based at least in part on a first configuration for communications in an unlicensed frequency band 1202 may correspond at least in some aspects to, for example, a scheduling component 430 as discussed herein. A module for scheduling a second set of subframes in the frame duration for radar detection based at least in part on the first configuration 1204 may correspond at least in some aspects to, for example, a scheduling component 430 as discussed herein. A module for comparing an amount of traffic to a scheduler threshold 1206 may correspond at least in some aspects to, for example, a comparing component 440 in conjunction with a communication device as discussed herein. A module for identifying a second configuration for communications in the unlicensed frequency band when the amount of traffic exceeds the scheduler threshold 1208 may correspond at least in some aspects to, for example, a configuring component 460 in conjunction with a communication device as discussed herein. A module for adjusting a number of subframes in the first and second set of subframes based on the second configuration for communications 1210 may correspond at least in some aspects to, for example, a configuring component 460 in conjunction with a communication device as discussed herein.

The functionality of the modules of FIG. 14 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 14 as well as other components and functions described herein, may be implemented using any suitable means. Such means also may be implemented, at least in part, using corresponding structure as taught herein. For example, the components described above in conjunction with the "module for" components of FIG. 14 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for scheduling a first set of subframes in a frame duration for traffic based at least in part on a first configuration for communications in an unlicensed frequency band; scheduling, based at least in part on the first configuration, a second set of subframes in the frame duration for detection of a primary user of the unlicensed frequency band (e.g., radar detection); and adjusting a number of subframes in the first and second set of subframes based on a second configuration for communications, wherein the second configuration for communications is identified based on a type of primary user being detected (e.g., radar type). Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communications, comprising:
   scheduling a first set of subframes in a frame duration for traffic based at least in part on a first configuration for communications in an unlicensed frequency band, wherein the first set of subframes in the first configuration comprises two sets of two consecutive subframes corresponding to downlink traffic periods;
   scheduling, based at least in part on the first configuration, a second set of subframes in the frame duration for detection of a primary user of the unlicensed frequency band, wherein the second set of subframes in the first configuration comprises two sets of three consecutive subframes corresponding to gap periods for detection of the primary user of the unlicensed frequency band;
   comparing an amount of traffic to a scheduler threshold;
   identifying a second configuration for communications in the unlicensed frequency band when the amount of traffic exceeds the scheduler threshold, wherein the second configuration for communications is identified based on a type of primary user being detected; and
   adjusting a number of subframes in the first and second set of subframes based on the second configuration for communications.

2. The method of claim 1, wherein adjusting the number of subframes in the first and second set of subframes based at least in part on the second configuration comprises:
   increasing the number of subframes in the first set; and
   decreasing the number of subframes in the second set.

3. The method of claim 2, wherein the first set of subframes in the second configuration comprises two sets of three consecutive subframes corresponding to downlink traffic periods, and wherein the second set of subframes in the second configuration comprises two sets of two consecutive subframes corresponding to gap periods for detection of the primary user of the unlicensed frequency band.

4. The method of claim 2, wherein the first set of subframes in the second configuration comprises two sets of two consecutive subframes and two sets of nonconsecutive subframes corresponding to downlink traffic periods, and wherein the second set of subframes in the second configuration comprises four sets of nonconsecutive subframes corresponding to gap periods for detection of the primary user of the unlicensed frequency band.

5. The method of claim 1, wherein comparing the amount of traffic to the scheduler threshold comprises comparing the amount of traffic scheduled for transmission on the first set of subframes to the scheduler threshold.

6. The method of claim 5, further comprising establishing the scheduler threshold based at least in part on a full utilization of the first set of subframes and a scheduled amount of traffic in a buffer.

7. The method of claim 6, further comprising:
   determining that the buffer is full of traffic scheduled for transmission on the first set of subframes; and
   scheduling traffic on all subframes in the frame duration in response to determining that the buffer is full of traffic scheduled for transmission on the first set of subframes.

8. The method of claim 1, wherein the subframes in each of the first and second set of subframes are configured as multi-cast broadcast single-frequency network (MBSFN) subframes.

9. The method of claim 1, wherein the unlicensed frequency band is an Unlicensed National Information Infrastructure (U-NII) radio band.

10. The method of claim 1, wherein the second set of subframes is configured to schedule data only for one or more common reference signal (CRS) symbols.

11. A computer-readable medium storing computer executable code for communication, comprising code to:
- schedule a first set of subframes in a frame duration for traffic based at least in part on a first configuration for communications in an unlicensed frequency band, wherein the first set of subframes in the first configuration comprises two sets of two consecutive subframes corresponding to downlink traffic periods;
- schedule, based at least in part on the first configuration, a second set of subframes in the frame duration for detection of a primary user of the unlicensed frequency band, wherein the second set of subframes in the first configuration comprises two sets of three consecutive subframes corresponding to gap periods for detection of the primary user of the unlicensed frequency band;
- compare an amount of traffic to a scheduler threshold;
- identify a second configuration for communications in the unlicensed frequency band when the amount of traffic exceeds the scheduler threshold, wherein the second configuration for communications is identified based on a type of primary user being detected; and
- adjust a number of subframes in the first and second set of subframes based on the second configuration for communications.

12. An apparatus for communication, comprising:
- means for scheduling a first set of subframes in a frame duration for traffic based at least in part on a first configuration for communications in an unlicensed frequency band, wherein the first set of subframes in the first configuration comprises two sets of two consecutive subframes corresponding to downlink traffic periods;
- means for scheduling, based at least in part on the first configuration, a second set of subframes in the frame duration for detection of a primary user of the unlicensed frequency band, wherein the second set of subframes in the first configuration comprises two sets of three consecutive subframes corresponding to gap periods for detection of the primary user of the unlicensed frequency band;
- means for comparing an amount of traffic to a scheduler threshold;
- means for identifying a second configuration for communications in the unlicensed frequency band when the amount of traffic exceeds the scheduler threshold, wherein the second configuration for communications is identified based on a type of primary user being detected; and
- means for adjusting a number of subframes in the first and second set of subframes based on the second configuration for communications.

13. An apparatus for communication, comprising:
- a memory storing executable instructions; and
- a processor in communication with the memory, wherein the processor is configured to execute the instructions to:
  - schedule a first set of subframes in a frame duration for traffic based at least in part on a first configuration for communications in an unlicensed frequency band, wherein the first set of subframes in the first configuration comprises two sets of two consecutive subframes corresponding to downlink traffic periods;
  - schedule, based at least in part on the first configuration, a second set of subframes in the frame duration detection of a primary user of the unlicensed frequency band, wherein the second set of subframes in the first configuration comprises two sets of three consecutive subframes corresponding to gap periods for detection of the primary user of the unlicensed frequency band;
  - compare an amount of traffic to a scheduler threshold;
  - identify a second configuration for communications in the unlicensed frequency band when the amount of traffic exceeds the scheduler threshold, wherein the second configuration for communications is identified based on a type of primary user being detected; and
  - adjust a number of subframes in the first and second set of subframes based on the second configuration for communications.

14. The apparatus of claim 13, wherein to adjust the number of subframes in the first and second set of subframes, the processor is further configured to execute the instructions to:
- increase the number of subframes in the first set; and
- decrease the number of subframes in the second set.

15. The apparatus of claim 14, wherein the first set of subframes in the second configuration comprises two sets of three consecutive subframes corresponding to downlink traffic periods, and wherein the second set of subframes in the second configuration comprises two sets of two consecutive subframes corresponding to gap periods for detection of the primary user of the unlicensed frequency band.

16. The apparatus of claim 14, wherein the first set of subframes in the second configuration comprises two sets of two consecutive subframes and two sets of nonconsecutive subframes corresponding to downlink traffic periods, and wherein the second set of subframes in the second configuration comprises four sets of nonconsecutive subframes corresponding to gap periods for detection of the primary user of the unlicensed frequency band.

17. The apparatus of claim 13, wherein to compare the amount of traffic to the scheduler threshold, the processor is further configured to execute the instructions to compare the amount of traffic scheduled for transmission on the first set of subframes to the scheduler threshold.

18. The apparatus of claim 17, wherein the processor is further configured to execute the instructions to establish the scheduler threshold based at least in part on a full utilization of the first set of subframes and a scheduled amount of traffic in a buffer.

19. The apparatus of claim 18, wherein the processor is further configured to execute the instructions to:
- determine that the buffer is full of traffic scheduled for transmission on the first set of subframes; and
- schedule traffic on all subframes in the frame duration in response to determining that the buffer is full of traffic scheduled for transmission on the first set of subframes.

20. The apparatus of claim 13, wherein the subframes in each of the first and second set of subframes are configured as multi-cast broadcast single-frequency network (MBSFN) subframes.

21. The apparatus of claim 13, wherein the unlicensed frequency band is an Unlicensed National Information Infrastructure (U-NII) radio band.

22. The apparatus of claim 13, wherein the second set of subframes is configured to schedule data only for one or more common reference signal (CRS) symbols.

* * * * *